United States Patent
Hirose et al.

(10) Patent No.: US 7,509,030 B2
(45) Date of Patent: Mar. 24, 2009

(54) REPRODUCING APPARATUS, REPRODUCING METHOD, DRIVING APPARATUS AND DRIVING METHOD FOR SELECTING VIDEO CLIPS AT A HIGH SPEED

(75) Inventors: Masaki Hirose, Tokyo (JP); Motohiro Terao, Kanagawa (JP); Takashi Furukawa, Kanagawa (JP); Hisao Tanaka, Tokyo (JP)

(73) Assignee: Sony Corporation, Tokyo (JP)

( * ) Notice: Subject to any disclaimer, the term of this patent is extended or adjusted under 35 U.S.C. 154(b) by 593 days.

(21) Appl. No.: 11/063,192

(22) Filed: Feb. 22, 2005

(65) Prior Publication Data

US 2005/0196150 A1    Sep. 8, 2005

(30) Foreign Application Priority Data

Feb. 24, 2004  (JP)  .............................. 2004-047553

(51) Int. Cl.
*H04N 5/76* (2006.01)
(52) U.S. Cl. ........................................ 386/125; 386/70
(58) Field of Classification Search ................ 386/123, 386/68, 67, 69, 70, 55, 117; 369/47.41, 53.31, 369/47.4, 124.04, 124.14, 83.29
See application file for complete search history.

(56) References Cited

U.S. PATENT DOCUMENTS

| | | | | |
|---|---|---|---|---|
| 5,074,029 A | * | 12/1991 | Brooks et al. | ............. 29/603.03 |
| 5,161,142 A | * | 11/1992 | Okano | ........................ 369/47.4 |
| 5,446,724 A | | 8/1995 | Tabe et al. | |
| 6,701,063 B1 | * | 3/2004 | Komoda et al. | ................ 386/95 |
| 6,870,802 B1 | * | 3/2005 | Kimura et al. | ............ 369/47.41 |
| 2002/0170058 A1 | | 11/2002 | Chang | |
| 2003/0206714 A1 | * | 11/2003 | Ando et al. | .................... 386/55 |

FOREIGN PATENT DOCUMENTS

| | | | |
|---|---|---|---|
| JP | 5 40939 | | 2/1993 |
| JP | 06290538 A | * | 10/1994 |
| JP | 08263938 A | * | 10/1996 |

(Continued)

OTHER PUBLICATIONS

Patent Abstracts of Japan, vol. 2000, No. 19, Jun. 5, 2001 & JP 2001 052373 A (Sony Corp), Feb. 23, 2001.

*Primary Examiner*—David E Harvey
(74) *Attorney, Agent, or Firm*—Frommer Lawrence & Haug LLP; William S. Frommer; Thomas F. Presson

(57) ABSTRACT

A method and apparatus for generating and editing audio and/or video data using thumbnail representations of the data. Thumbnail representations are generated in accordance with clips randomly recorded on a disc, or other storage medium, and edit points are designated for the clips. When thumbnail representations are displayed, the disc is rotated at constant angular velocity (CAV). Video data of the thumbnail representations are read from the disc. When a desired thumbnail representation is selected and designated, the disc drive system is switched from CAV drive mode to constant linear velocity (CLV) drive mode. Video are reproduced from the position of the selected thumbnail representations. Since the thumbnail representations are read in the CAV drive mode that is suitable for randomly accessing the disc, the thumbnail representations can be displayed at high speed.

11 Claims, 15 Drawing Sheets

FOREIGN PATENT DOCUMENTS

| | | | |
|---|---|---|---|
| JP | 09180364 A | * | 7/1997 |
| JP | 2000 306243 | | 11/2000 |
| JP | 2000322873 A | * | 11/2000 |
| JP | 2003 111010 | | 4/2003 |
| JP | 2003 187500 | | 7/2003 |
| WO | WO 00/22615 | * | 4/2000 |
| WO | WO 00/30357 A1 | * | 5/2000 |
| WO | WO 03 046912 | | 6/2003 |

* cited by examiner

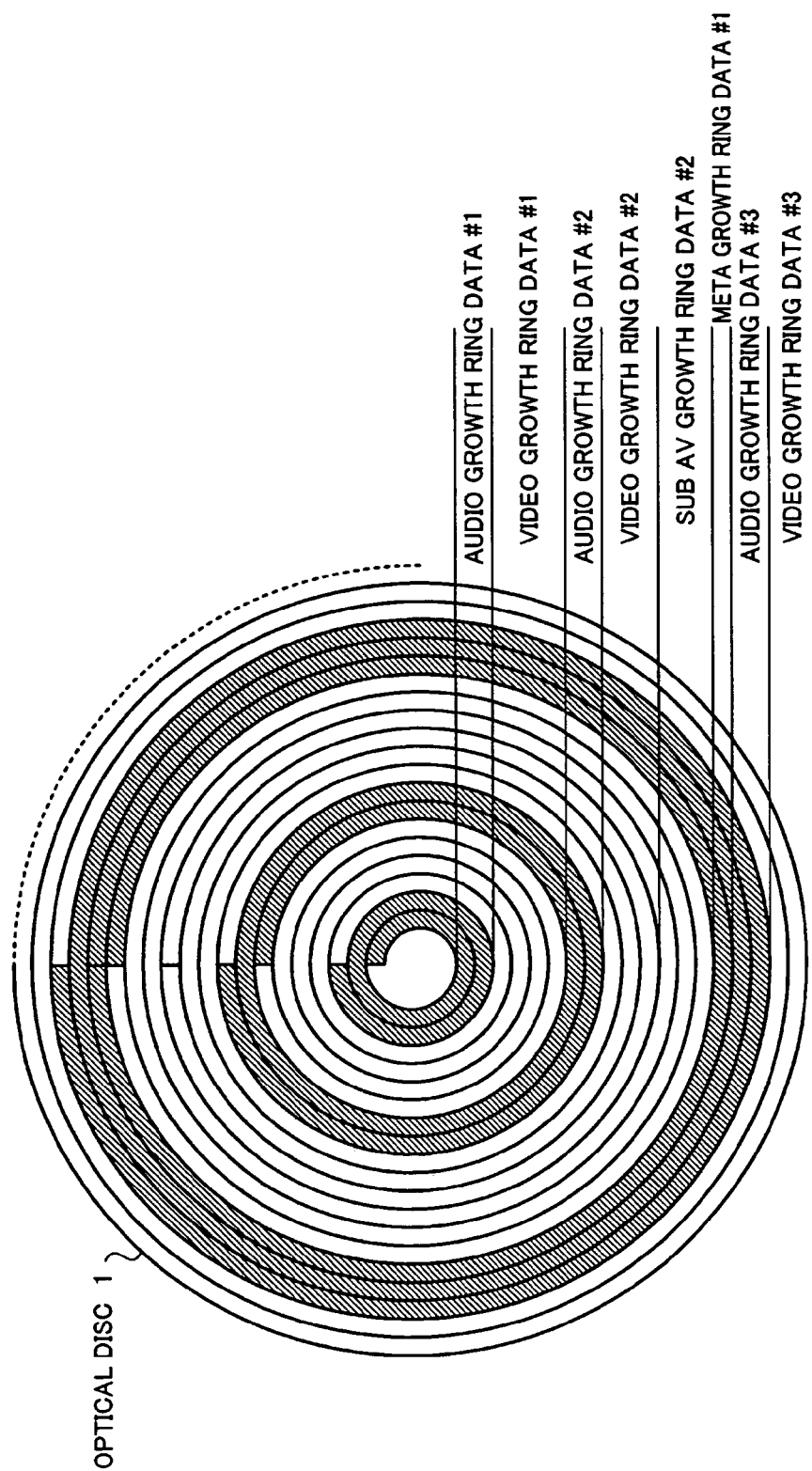

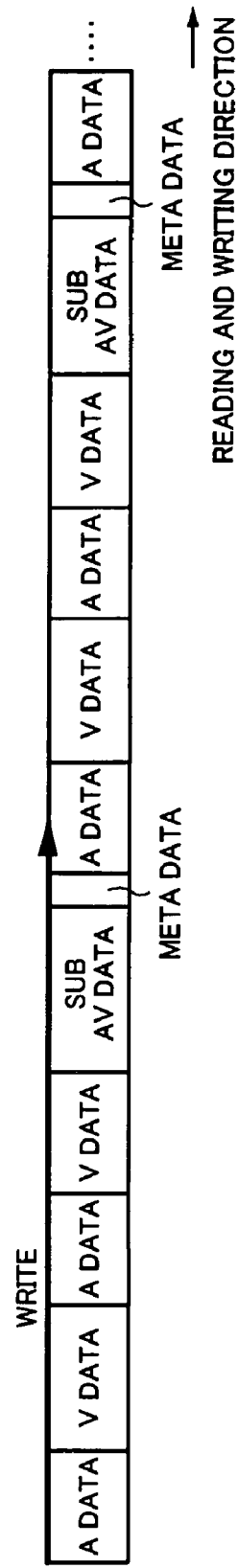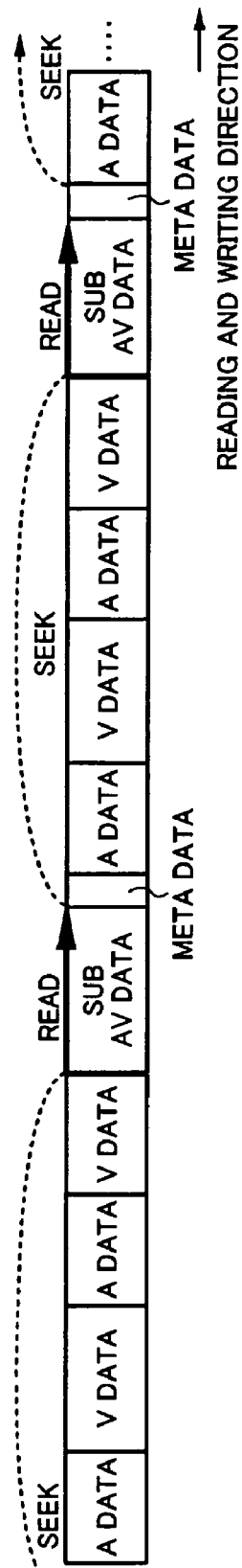

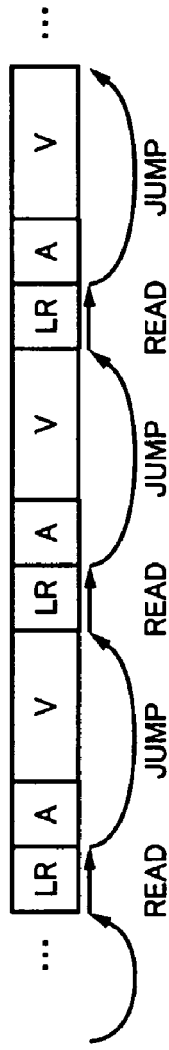
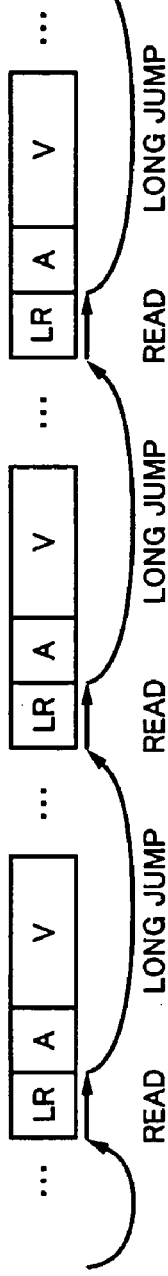
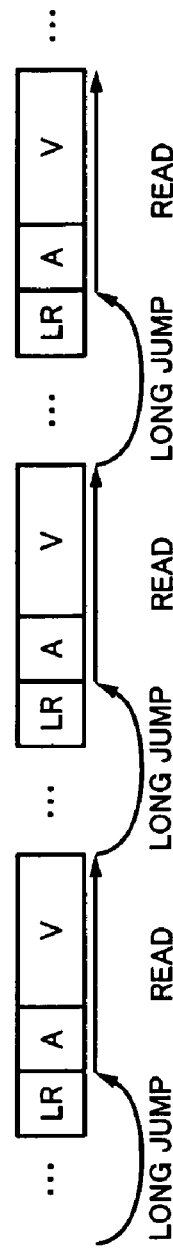
Fig. 3A
Fig. 3B
Fig. 3C

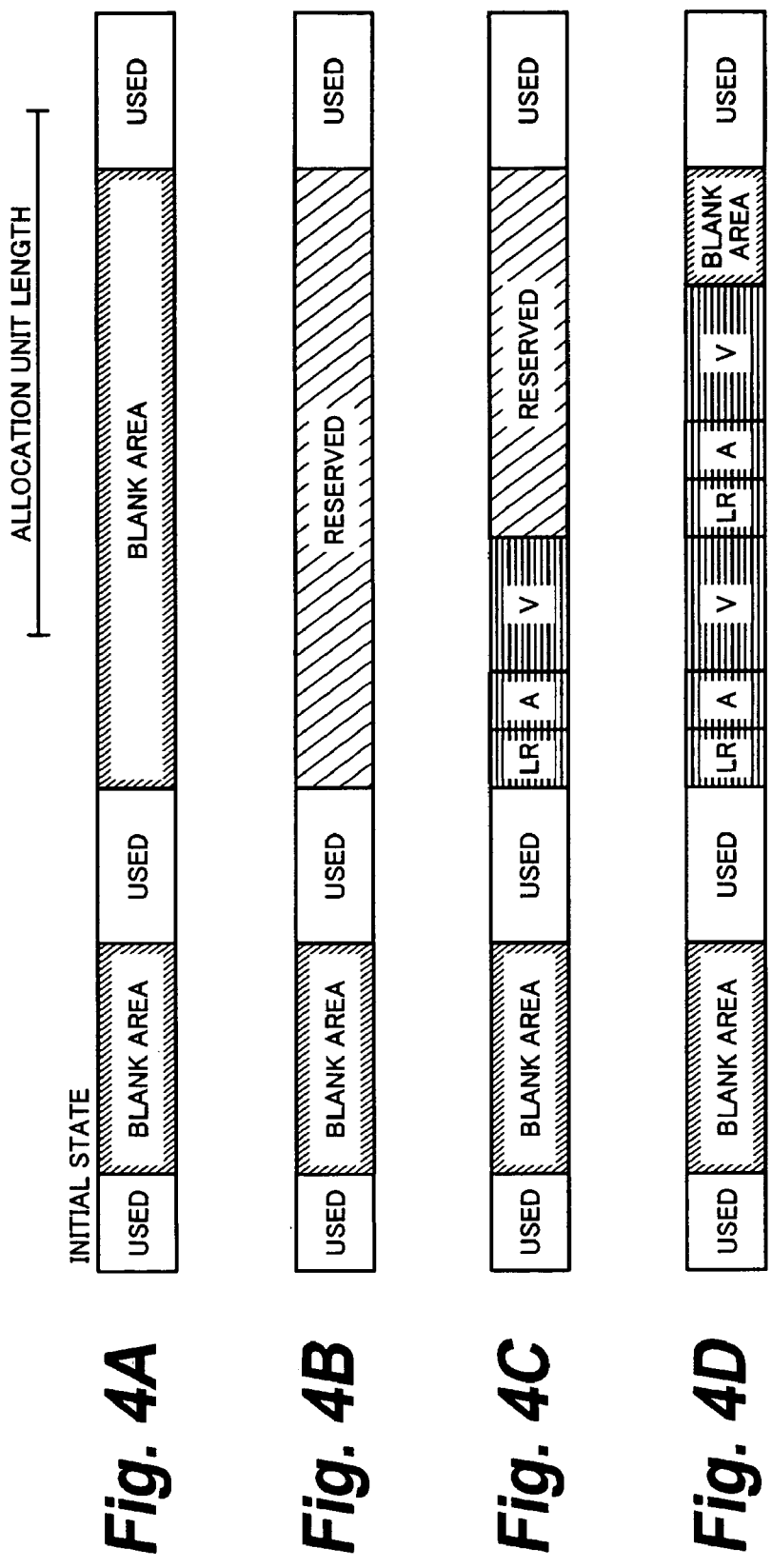

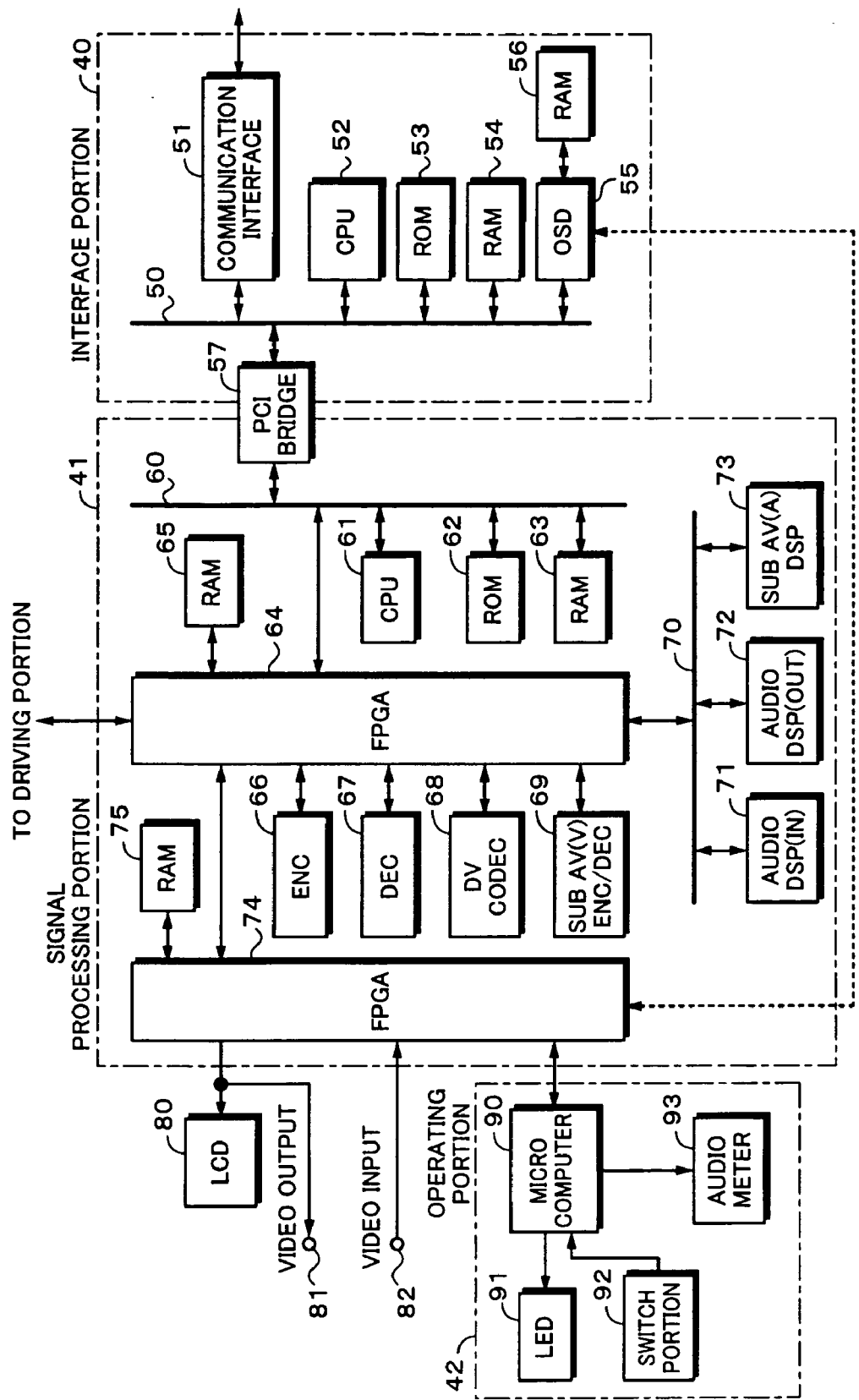

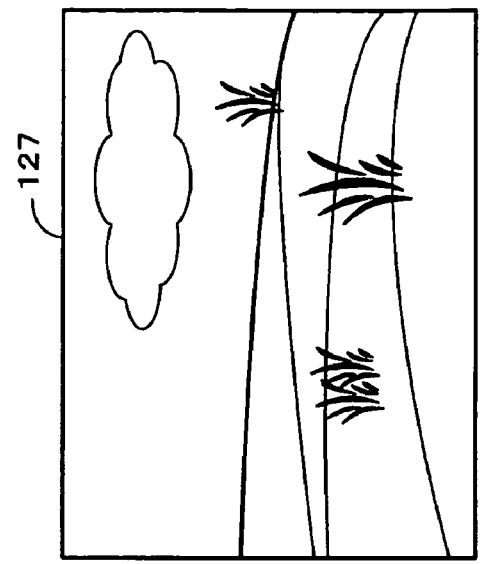
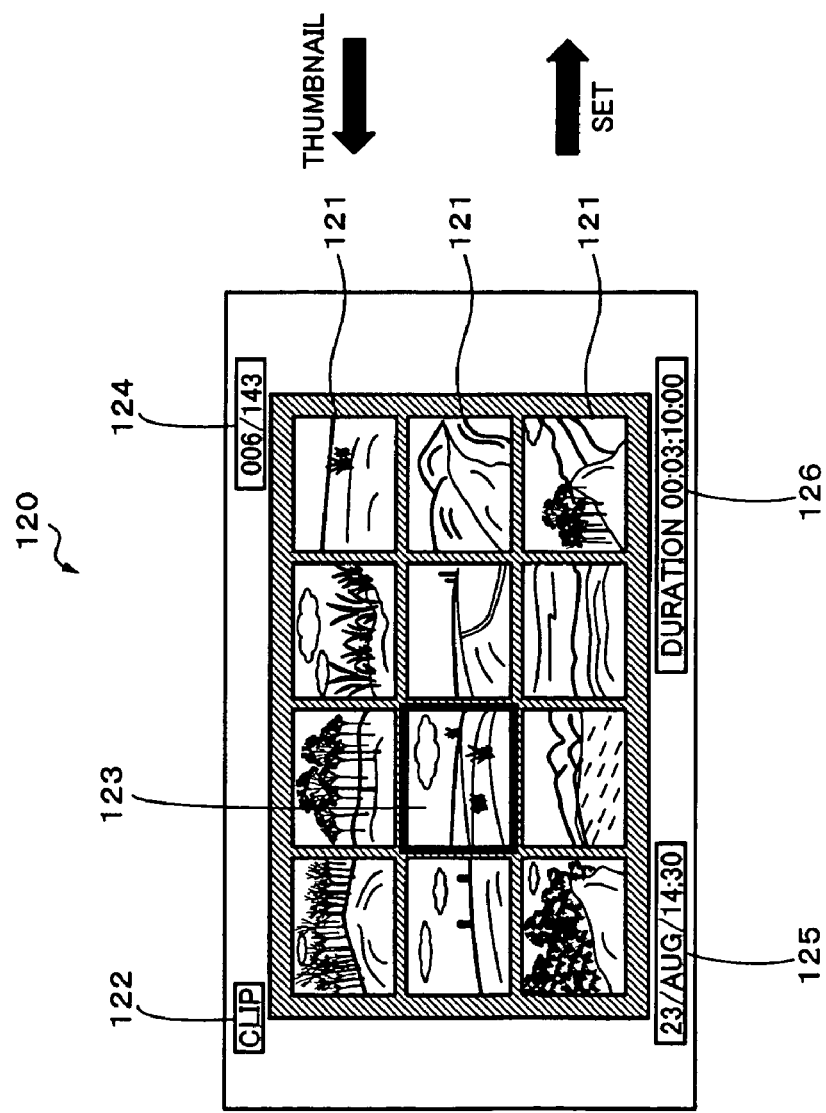

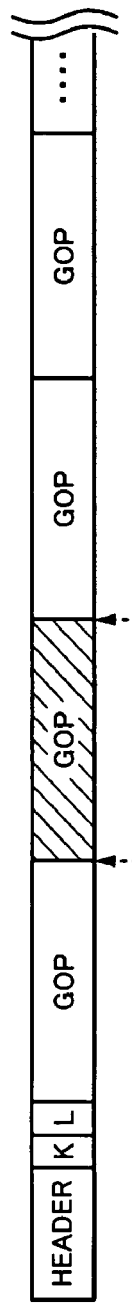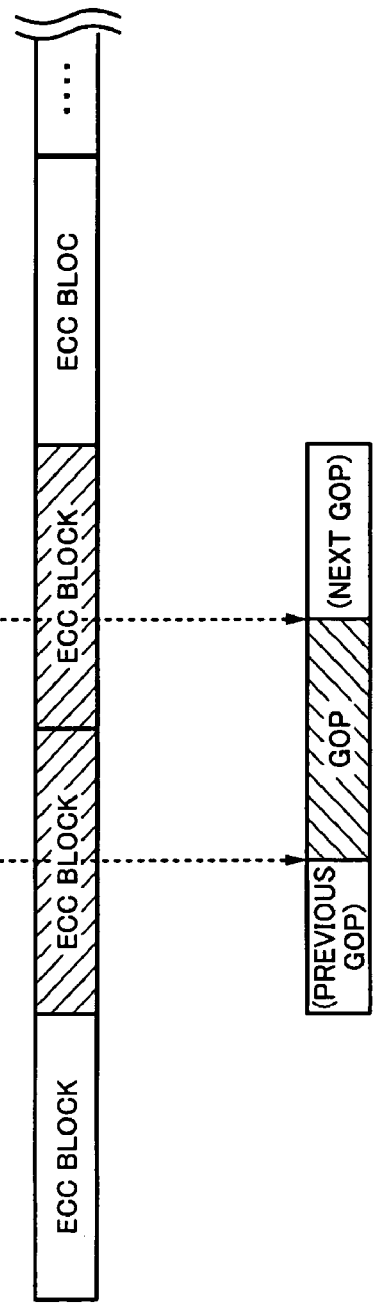
Fig. 14A
Fig. 14B
Fig. 14C

REPRODUCING APPARATUS, REPRODUCING METHOD, DRIVING APPARATUS AND DRIVING METHOD FOR SELECTING VIDEO CLIPS AT A HIGH SPEED

BACKGROUND

1. Field of the Invention

The present invention relates generally to a reproducing apparatus, a reproducing method, a driving apparatus, and a driving method that allow video clips to be selected from many video clips recorded on a recording medium at high speed.

2. Background Discussion

In recent years, a disc-shaped recording medium that uses laser light having a short wavelength and that can record and reproduce a larger capacity of data has been developed. For example, a recording capacity of 23 Giga bytes (GB) has been accomplished with a light source of a blue-purple laser that emits laser light having a wavelength of 405 nm and that uses a single-surface single-layer optical disc.

One approach is described in Japanese Patent Laid-Open Publication No. 2001-197426.

Conventionally, to display a thumbnail picture at high speed, bit map picture data are generated with a desired frame and recorded on a recording medium. When the generated thumbnail picture is displayed, the bit map picture data are displayed.

However, typically if frames to be displayed as thumbnail pictures are frequently changed like a non-destructive editing operation, when frames to be displayed as thumbnail pictures are changed, bit map picture data should be newly generated. Thus, the process cannot be quickly performed. In addition, since bit map picture data for thumbnail pictures should be recorded onto a disc-shaped recorded medium along with video data, the capacity of the recording medium is wasted.

Thus, it would be an advancement in the state of the art to permit a user to edit clips quickly and efficiently.

SUMMARY OF THE INVENTION

Therefore, an object of the present invention is to provide a reproducing apparatus, a reproducing method, a driving apparatus, and a driving method that allow a thumbnail picture to be displayed at high speed.

One embodiment of the present invention is directed to a reproducing apparatus. The apparatus includes a driving means for rotationally driving a disc-shaped recording medium at constant linear velocity (CLV) and constant angular velocity (CAV) and a reproducing means for reproducing first video data and/or second video data from the disc-shaped recording medium rotationally driven by the driving means. The second video data having been compression-encoded at a higher compression rate than the first video data. The reproducing means is configured to operate in a first operation mode and a second operation mode, wherein the reproducing means is configured to chronologically and successively reproduce the first video data and/or the second video data from the disc-shaped recording medium in the first operation mode and to dispersedly reproduce the second video data from the disc-shaped recording medium, generate a thumbnail picture with the reproduced second video data, and display the thumbnail picture in the second operation mode. When the reproducing means operates in the first operation mode, the driving means is configured to rotationally drive the disc-shaped recording medium at CLV, and when the reproducing means operates in the second operation mode, the driving means is configured to rotationally drive the disc-shaped recording medium at CAV.

Another embodiment of the present invention is directed to a reproducing method. The method includes rotationally driving a disc-shaped recording medium at CLV and CAV; and reproducing first video data and/or second video data from the disc-shaped recording medium rotationally driven at the driving step, the second video data having been compression-encoded at a higher compression rate than the first video data. The reproducing step is performed by operating in a first operation mode and a second operation mode, wherein the reproducing step is performed by chronologically and successively reproducing the first video data and/or the second video data from the disc-shaped recording medium in the first operation mode and by dispersedly reproducing the second video data from the disc-shaped recording medium. A thumbnail picture is generated with the reproduced second video data, and displayed in the second operation mode. When the reproducing step is performed by operating in the first operation mode, the driving step is performed by rotationally driving the disc-shaped recording medium at CLV, and when the reproducing step is performed by operating in the second operation mode, the driving step is performed by rotationally driving the disc-shaped recording medium at CAV.

Yet another embodiment of the present invention is directed to a driving apparatus for rotationally driving a disc-shaped recording medium at CLV and CAV. First video data and/or second video data are recorded on the disc-shaped recording medium, the second video data having been compression-encoded at a higher compression rate than the first video data. The disc-shaped recording medium is rotationally driven at CLV in a first operation mode of which the first video data and/or the second video data are chronologically and successively reproduced from the disc-shaped recording medium and at CAV in a second operation mode of which the second video data are dispersedly, or randomly, reproduced from the disc-shaped recording medium. A thumbnail picture is generated with the reproduced second video data, and the thumbnail picture is displayed.

Yet another embodiment of the present invention is directed to a driving method for rotationally driving a disc-shaped recording medium at CLV and CAV. First video data and/or second video data are recorded on the disc-shaped recording medium, the second video data having been compression-encoded at a higher compression rate than the first video data, the driving method comprising the steps of: rotationally driving the disc-shaped recording medium at CLV in a first operation mode of which the first video data and/or the second video data are chronologically and successively reproduced from the disc-shaped recording medium; rotationally driving the disc-shaped recording medium at CAV in a second operation mode of which the second video data are dispersedly, or randomly, reproduced from the disc-shaped recording medium, a thumbnail picture is generated with the reproduced second video data, and the thumbnail picture is displayed.

As described above, in the first operation mode of which first and/or second video data are chronologically and successively reproduced from the disc-shaped recording medium, the first video data having been compression-encoded at a higher compression rate than the second video data, the disc-shaped recording medium is rotationally driven at CLV. In the second operation mode of which second video data are dispersedly reproduced from the disc-shaped recording medium, a thumbnail picture is generated with the reproduced second video data, and the thumbnail picture is displayed, the disc-shaped recording medium is rotationally driven at CAV. Thus, dispersed positions of the disc-shaped recording medium can be successively accessed at high speed. As a result, a thumbnail picture ca be generated and displayed at high speed.

As described above, in the first operation mode of which first and/or second video data are chronologically and successively reproduced from the disc-shaped recording medium, the first video data having been compression-encoded at a higher compression rate than the second video data, a CLV drive mode is used. In the second operation mode of which the second video data are dispersedly reproduced from the disc-shaped recording medium, a thumbnail picture is generated with the reproduced second video data, and the thumbnail picture is displayed, a CAV drive mode is used. Thus, dispersed positions of the disc-shaped recording medium can be successively accessed at high speed. As a result, the second operation mode can be performed at high speed.

According to the present invention, when a normal clip is reproduced, the disc is driven at CLV. When a thumbnail picture is displayed, the disc is driven at CAV. Thus, when a thumbnail picture is displayed, the disc can be randomly accessed at high speed. A frame for the thumbnail picture can be quickly read. As a result, the thumbnail picture can be displayed at high speed.

Thus, it is not necessary to generate bit map data for the thumbnail picture. In addition, when the positions of thumbnail pictures are frequently changed, the editing operation can be smoothly performed.

In addition, according to the present invention, a thumbnail picture is generated with sub audio-video (sub AV) data having a lower resolution and a lower data rate than main AV data. Thus, the load of the system can be reduced in comparison with the case that a thumbnail picture is generated with main AV data.

These and other objects, features and advantages of the present invention will become more apparent in light of the following detailed description of a best mode embodiment thereof, as illustrated in the accompanying drawings.

BRIEF DESCRIPTION OF THE DRAWINGS

The invention will become more fully understood from the following detailed description, taken in conjunction with the accompanying drawing, wherein similar reference numerals denote similar elements, in which:

FIG. 1 is a schematic diagram showing an example of growth ring data formed on an optical disc.

FIG. 2A and FIG. 2B are schematic diagrams showing examples of which data are read from and written to an optical disc on which growth rings have been formed.

FIG. 3A, FIG. 3B, and FIG. 3C are schematic diagrams describing that data are recorded on the disc so that the succession of growth rings is secured.

FIG. 4A, FIG. 4B, FIG. 4C, and FIG. 4D are schematic diagrams describing allocation units.

FIG. 9 is a block diagram showing an example of the overall structure of the recording and reproducing apparatus according to the embodiment of the present invention.

FIG. 11A and FIG. 11B are schematic diagrams showing an example of a thumbnail display screen.

FIG. 14A, FIG. 14B, and FIG. 14C are schematic diagrams describing a process for reading GOPs in accordance with ECC blocks.

DETAILED DESCRIPTION OF THE PREFERRED EMBODIMENTS

Figure 5:
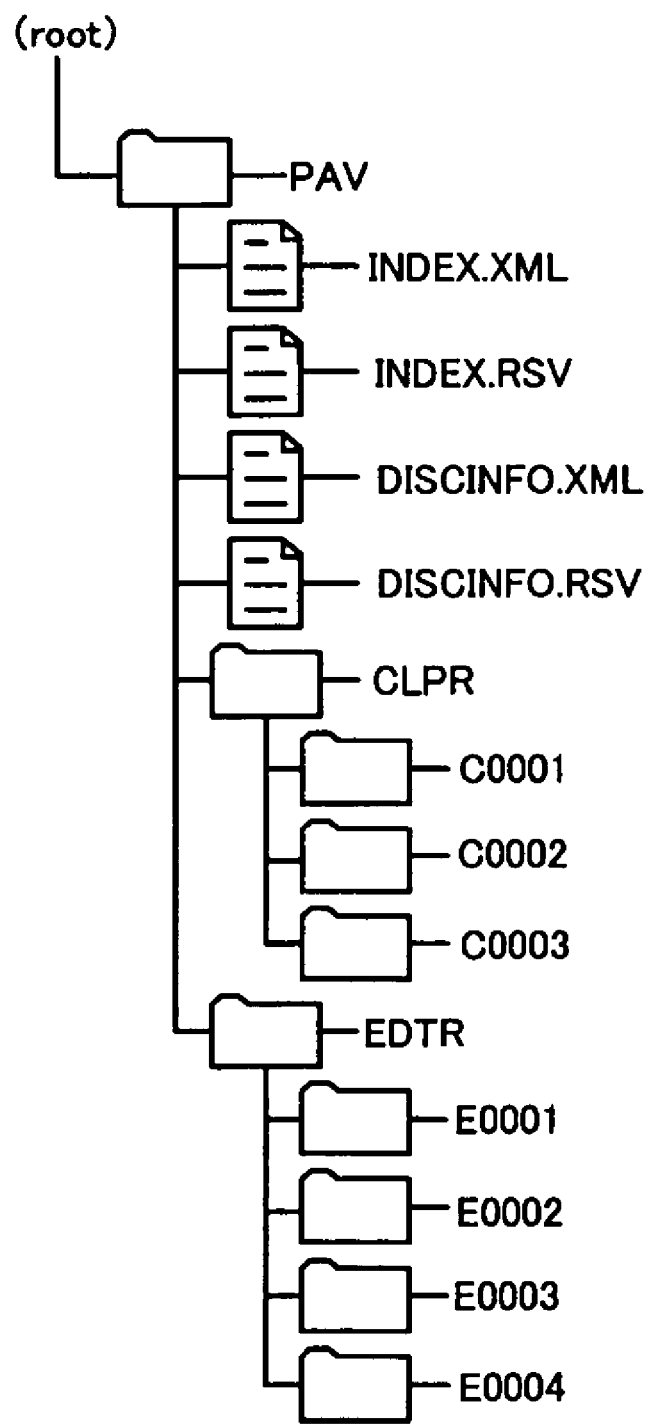
FIG. 5 is a schematic diagram describing a management structure of data.

A disc-shaped recording medium may be used for an audio visual device for a broadcasting station. The disc-shaped recording medium is loaded into a video camera or a camera controller connected thereto. Video data corresponding to a picture photographed by the video camera are recorded onto the loaded disc-shaped recording medium. Video data are recorded as files corresponding to clips. A clip is a sequence of data recorded after a photography is started until it is stopped.

In addition, since the disc-shaped recording medium can be randomly accessed, video data can be conveniently edited. For example, the start position and an edit point of a clip can be more quickly searched and designated than the conventional tape-shape recording medium. Moreover, video data edited on the disc-shaped recording medium can be recorded onto the same recording medium. Video data that have been recorded on the disc-shaped recording medium can be edited at the site, not sent to an editing studio.

When clips are edited, if a picture of the first frame of each clip and the pictures of edit points (IN point and OUT point) of each clip are converted into thumbnail pictures and they are displayed as a list, a desired clip and edit points thereof can be quickly searched. Thus, clips can be effectively edited. Desired pictures can be selected with reference to the thumbnail pictures and edit clips. A thumbnail picture is a reduced picture of which a thin-out process is performed for a picture of a frame of real video data.

To solve such problems, while a frame is being reproduced, a thumbnail picture is generated. This method can be used when the positions of thumbnail pictures are frequently changed. In addition, the capacity of the disc-shaped recording medium is not wasted. However, whenever the thumbnail picture display mode is designated, the disc-shaped recording medium is accessed for the corresponding frame this is not successively recorded on the disc-shaped recording medium. Thus, the thumbnail picture cannot be quickly displayed.

When highly fine video data are used, it takes a long time to generate a thumbnail picture. When many thumbnail pictures are generated, after the thumbnail picture display mode is designated, it takes a long time until the thumbnail picture is displayed. As a result, the editing operation may not be smoothly preformed.

Next, an embodiment of the present invention will be described. According to the present invention, video data and audio data that are broadcast and edited are recorded on a disc-shaped recording medium. In addition, sub video data, sub audio data, and meta data are recorded on the same disc. Video data and audio data that are broadcast and edited are referred to as main audio/video (AV) data. On the other hand, sub video data and sub audio data are referred to as sub AV data. Video data and audio data of sub AV data are referred to as sub video data and sub audio data, respectively.

Video data of main AV data are base-band video data that are compression-encoded in accordance with the moving picture experts group 2 (MPEG2) system at a bit rate of 50 Mega bits per second (Mbps) and/or 25 Mbps. On the other hand, audio data of main AV data are data that are sampled at 48 kHz and quantized with 24 bits and/or 16 bits. According to the present invention, video data and audio data of main AV data that have been encoded in accordance with these different systems are recorded on the same disc.

On the other hand, sub AV data are audio/video data whose bit rate is lower than main AV data. When main AV data are recorded onto the disc, sub AV data are generated with the main AV data. The sub video data are compression-encoded in accordance with for example the MPEG4 system. In addition, the sub audio data are compression-encoded in accordance with for example A-Law system and sample thin-out process. Thus, the bit rate of the sub AV data is decreased to for example several Mbps against the main AV data.

Video data can be compression-encoded with both an intraframe compression code in accordance with the discrete cosine transform (DCT) system and an interframe compression code in accordance with the chronological predictive encoding system. In the MPEG system, a bidirectional (B) picture and a predictive (P) picture that are chronologically and predictively encoded are defined. In addition, an intra (I) picture that is composed with one screen (one frame) is defined. A group-of-picture (GOP) is a group that contains at least one I picture and that is self completed. A GOP is a minimum accessible unit of an MPEG stream.

Meta data are high level data. Meta data functions as an index that represents the contents of various types of data. Meta data are categorized as chronological meta data and non-chronological meta data. The chronological meta data are chronologically generated in accordance with main AV data. The non-chronological meta data are generated in predetermined regions such as scenes of main AV data.

Next, a data arrangement on a disc-shaped recording medium according to an embodiment of the present invention will be described. According to the present invention, data are recorded as if growth rings were formed on a disc. Hereinafter, such data are referred to as simply ring data, or annulus data. The ring data are recorded on a disc in the unit of a data amount represented by reproduction duration of data. Assuming that data recorded on a disc is only audio data and video data of main AV data, the audio data and the video data in a reproduction time zone are alternately placed every predetermined reproduction duration equivalent to a data size of one track or more. When audio data and video data are recorded in such a manner, sets of them are time-sequentially layered as growth rings.

In addition to audio data and video data in a reproduction time zone, sub AV data and chronological meta data in the reproduction time zone are recorded as a set. As a result, a growth ring is formed on an optical disc 1.

Data that composes a growth ring is referred to as growth ring data. Growth ring data have a data amount that is an integer multiple of a data amount of a sector that is the minimum recording unit of the disc. In addition, growth ring data are recorded so that the boundary thereof matches the boundary of a sector of the disc.

FIG. 1 shows an example of which growth ring data are formed on the optical disc 1. In the example shown in FIG. 1, audio growth ring data #1, video growth ring data #1, audio growth ring data #2, video growth ring data #2, sub AV growth ring data #1, and chronological meta growth ring data #1 are recorded from the inner periphery side of the optical disc 1. In such a cycle, growth ring data are treated. On the outer periphery of the chronological meta growth ring data #1, part of growth ring data of the next cycle is formed as audio growth ring data #3 and video growth ring data #3.

In the example shown in FIG. 1, a reproduction time zone of data of one growth ring of chronological meta growth ring data corresponds to that of sub AV growth ring data. A reproduction time zone of data of one growth ring of chronological meta growth ring data corresponds to that of data of two growth rings of audio growth ring data. Likewise, a reproduction time zone of data of one growth ring of chronological metal growth ring data corresponds to that of two growth rings of video data. The relation between a reproduction time zone and the number of cycles of each type of growth ring data depends on for example the data rate thereof. It is preferred that the reproduction duration of data of one growth ring of video growth ring data and audio growth ring data should be approximately between 1.5 to 2 seconds.

FIG. 2A and FIG. 2B show examples of which data are read from and written to the optical disc 1 on which growth rings are formed as shown in FIG. 1. When the optical disc 1 has a sufficient successive error-free blank area, as shown in FIG. 2A, audio growth ring data, video growth ring data, sub AV growth ring data, and chronological meta growth ring data generated from data sequences of audio data, video data, and sub AV data chronological meta data in accordance with a reproduction time zone are written to the blank area of the optical disc 1 as if they were written in a single stroke. At that point, each type of data are written so that the boundary thereof matches the boundary of a sector of the optical disc 1. Data of the optical disc 1 are read in the same manner as they are written thereto.

On the other hand, when a predetermined data sequence is read from the optical disc 1, an operation for seeking the record position of the data sequence and reading the data is repeated. FIG. 2B shows an operation for selectively reading a sequence of sub AV data in such a manner. For example, with reference to FIG. 1, after the sub AV growth ring data #1 are read, the chronological meta growth ring data #1, the audio growth ring data #3, the video growth ring data #3, the audio growth ring data #4, and video growth ring data #4 (not shown) are sought and skipped. Thereafter, sub AV growth ring data #2 of the next cycle are read.

In such a manner, since data are recorded on the optical disc 1 cyclically as growth ring data in accordance with a reproduction time zone in the unit of a predetermined reproduction duration, audio growth ring data and video growth ring data in the same reproduction time zone are placed at close positions on the optical disc 1. Thus, audio data and video data in the same reproduction time zone can be quickly read and reproduced from the optical disc 1. In addition, since audio data and video data are recorded so that the boundaries of growth rings match the boundaries of sectors, only audio data or video data can be read from the optical disc 1. As a result, only audio data or video data can be quickly edited.

In addition, as described above, the data amount of each of audio growth ring data, video growth ring data, sub AV growth ring data, and chronological meta growth ring data is an integer multiple of the data amount of a sector of the optical disc 1. Moreover, growth ring data are recorded so that the boundaries thereof match the boundaries of sectors. Thus, when only one of sequences of audio growth ring data, video growth ring data, sub AV growth ring data, and chronological meta growth ring data is required, only required data can be read without need to read other data.

To most effectively use the advantage of the data arrangement of growth rings of the optical disc 1, data should be recorded so that the succession of growth rings is secured. Next, an operation for securing the succession of growth rings will be described with reference to FIG. 3A, FIG. 3B, and FIG. 3C. Now, it is assumed that only sub AV growth ring data (denoted by LR in FIG. 3) is read.

When data are recorded, if a large blank area is secured on the optical disc 1, a plurality of growth rings can be successively recorded. In this case, as shown in FIG. 3A, chronologically successive sub AV growth ring data can be read by a minimum number of track jumps. In other words, an operation of which after sub AV growth ring data are read, the next sub AV growth ring data are read can be repeated. As a result, the distance for which the pickup jumps becomes the minimum.

In contrast, when data are recorded, if a successive blank area cannot be secured and chronologically successive sub AV data are recorded in separate areas on the optical disc 1, as shown in FIG. 3B, after reading the first sub AV growth ring data, the pickup should jump for a distance of a plurality of growth rings so as to read the next sub AV growth ring data. Since this operation is repeated, the read speed for sub AV growth ring data is decreased from that shown in FIG. 3A. In addition, the reproduction of non-edited AV data (AV clips) may be delayed as shown in FIG. 3C.

Thus, according to the embodiment of the present invention, an allocation unit having a length of a plurality of growth rings is defined so as to secure the succession of growth rings. When data are recorded as growth rings, a successive blank area that exceeds an allocation unit length defined by the allocation unit is secured.

Next, with reference to FIG. 4A, FIG. 4B, FIG. 4C, and FIG. 4D, an operation for securing a successive blank area will be practically described. The allocation unit length is pre-designated. The allocation unit length is designated to a multiple of a total reproduction duration of individual types of data in one growth ring. Assuming that the reproduction duration of one growth ring is 2 seconds, the allocation unit length is designated to 10 seconds. The allocation unit length is used as a rule for measuring the length of a blank area of the optical disc 1 (see an upper right portion of FIG. 4A). As shown in FIG. 4A, it is assumed that there are three used areas that are separate areas on the optical disc 1 and that areas surrounded by the used areas are blank areas.

When AV data having a predetermined length and sub AV data corresponding thereto are recorded onto the optical disc 1, the allocation unit length is compared with the lengths of blank areas and a blank area having a length equal to or larger than the allocation unit length is secured as a reserved area (see FIG. 4B). In the example shown in FIG. 4A, it is assumed that the right side blank area of the two blank areas is longer than the allocation unit length and secured as a reserved area. Thereafter, growth ring data are successively recorded to the reserved area from the beginning (see FIG. 4C). When the growth ring data are recorded and the length of the blank area of the reserved area is smaller than the length of one growth ring that is recorded next (FIG. 4D), the reserved area is unallocated. As shown in FIG. 4A, another bank area that is equal to or larger than the allocation unit length is searched for a reserved area.

Since a blank area for a plurality of growth rings is sought and the growth rings are recorded in the sought blank area, the succession of the growth rings is secured to some extent. As a result, growth ring data can be smoothly reproduced. In the foregoing example, it was assumed that the allocation unit length is designated to 10 seconds. However, the present invention is not limited to such an example. Instead, a longer period can be designated as the allocation unit length. In reality, it is preferred that the allocation unit length should be designated in the range from 10 to 30 seconds.

Next, with reference to FIG. 5, FIG. 6, and FIG. 7, a data management structure according to the embodiment of the present invention will be described. According to the present invention, data are managed in a directory structure. In the directory structure, for example, the universal disk format (UDF) is used as a file system. As shown in FIG. 5, immediately below a root directory, a directory PAV is placed. According to the embodiment, sub directories of the directory PAV will be defined.

Thus, audio data and video data of a plurality of types of signals recorded on one disc are defined below the directory PAV. Data may be or may not be recorded in the directory PAV that is not managed according to the embodiment of the present invention.

Immediately below the directory PAV, four files (INDEX.XML, INDEX.RSV, DISCINFO.XML, and DISCINFO.RSV) are placed. In addition, two directories (CLPR and EDTR) are placed.

The directory CLPR serves to manage clip data. In this example, a clip is a block of data recorded after a photography is started until it is stopped. For example, in an operation of a video camera, data recorded after an operation start button is pressed until an operation stop button is pressed (the operation start button is released) is one clip.

In this example, a block of data is composed of the foregoing main audio data and main video data, sub AV data generated with the main audio data and main video data, chronological meta data corresponding to the main audio data and main video data, and non-chronological meta data. Directories "C0001," "C0002," and so forth immediately below the directory CLPR each store a block of data that composes a clip.

Figure 6:
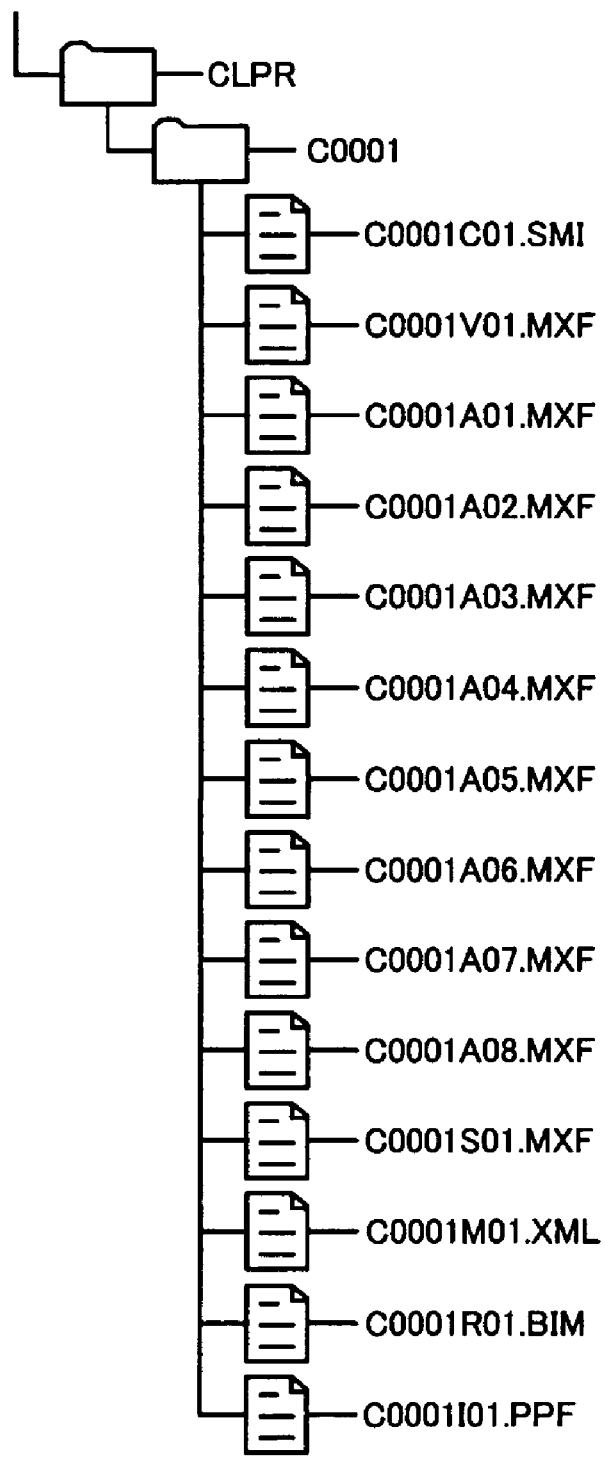
FIG. 6 is a schematic diagram describing a management structure of data.

FIG. 6 shows an example of the structure of the directory "C0001" for one clip "C0001" placed immediately below the directory CLPR. Hereinafter, a directory for one clip placed immediately below the directory CLPR is referred to as clip directory. Each member of data that compose a block of data is identified by a file name and placed in the clip directory "C0001." In the example shown in FIG. 6, a file name is composed of 12 digits including a delimiter ".". The first five digits of eight digits followed by the delimiter "." are used to identify a clip. The three digits immediately followed by the delimiter "." are used to identify data type such as audio data, video data, and sub AV data. The three digits immediately preceded by the delimiter "." are an extension that represents a data format.

In reality, in the example shown in FIG. 6, as a block of files that compose the clip "C0001," a file "C0001C01.SMI" for clip information, a main video data file "C0001V01.MXF," main audio data files of eight channels "C0001A01.MXF" to "C0001A08.MXF," a sub AV data file "C0001S01.MXF," a non-chronological meta data file "C0001M01.XML," a chronological meta data file "C0001R01.BIM," and a pointer information file "C0001I01.PPF" are placed in the clip directory "C0001."

According to the present invention, the foregoing types of data signals can be placed in clip directories of the directory CLPR. For example, as signal types of main video data, video data of single GOP and 50 Mbps can be placed in the clip directory "C0001" and video data of long GOP and 25 Mpbs can be placed in the clip directory "C0002." On the other hand, a plurality of types of data signals cannot be placed in one clip directory. For example, a video data file of which one portion has been recorded at a bit rate of 50 Mbps and the rest has been recorded at a bit rate of 25 Mbps cannot be placed in a clip directory.

In all frames, a single GOP is composed of only an I picture and has a structure of 1 GOP=1 frame. A single frame can be edited in high quality. A long GOP is composed of a plurality of frames that are I pictures, P pictures, and B pictures. One long GOP is completed with an I picture. A long GOP may be composed of only an I picture and a P picture without a B picture.

Returning to FIG. 5, the directory EDTR serves to manage edit information. An edit result may be recorded as an edit list and a play list. Blocks of data each of which composes an edit result are placed in directories "E0001," "E0002," and so forth placed immediately below the directory EDTR.

An edit list describes edit points (IN points, OUT points, and so forth) of clips, a reproduction order thereof, and so forth. An edit list is composed of nondestructively edit results of clips and a play list that will be described later. When a nondestructively edit result of an edit list is reproduced, files placed in a clip directory are referenced in accordance with the description of the list and a picture is successively reproduced from a plurality of clips as if one edited stream were reproduced. However, for a nondestructively edit result, files are referenced from the list regardless of the positions of the files on the optical disc 1. Thus, the succession of reproduced data is not secured.

When an edit result represents that files or a part thereof cannot be successively reproduced, a play list causes the files or part thereof to be reallocated in a predetermined area of the optical disc 1 so as to secure the succession of reproduced data according to an edit list.

In accordance with an edit list created by an editing operation, management information for files that are used for the editing operation (for example, an index file "INDEX.XML" that will be described later) is referenced. With reference to the management information, it is determined whether or not files that are referenced can nondestructively, namely successively, be reproduced in the state that the files that are referenced in accordance with the edit result are placed in respective clip directories. When the determined result represents that the files cannot be successively reproduced, relevant files are copied to a predetermined area of the optical disc 1. These files copied to the predetermined area are referred to as bridge essence files. A list of which bridge essence files are reflected to an edit result is referred to as play list.

For example, when clips are reproduced in accordance with an edit result that complicatedly references the clips, the pickup may not be able to seek a clip to be reproduced next in time. In such a case, a play list is created. Bridge essence files are recorded in the predetermined area of the optical disc 1.

Figure 7:
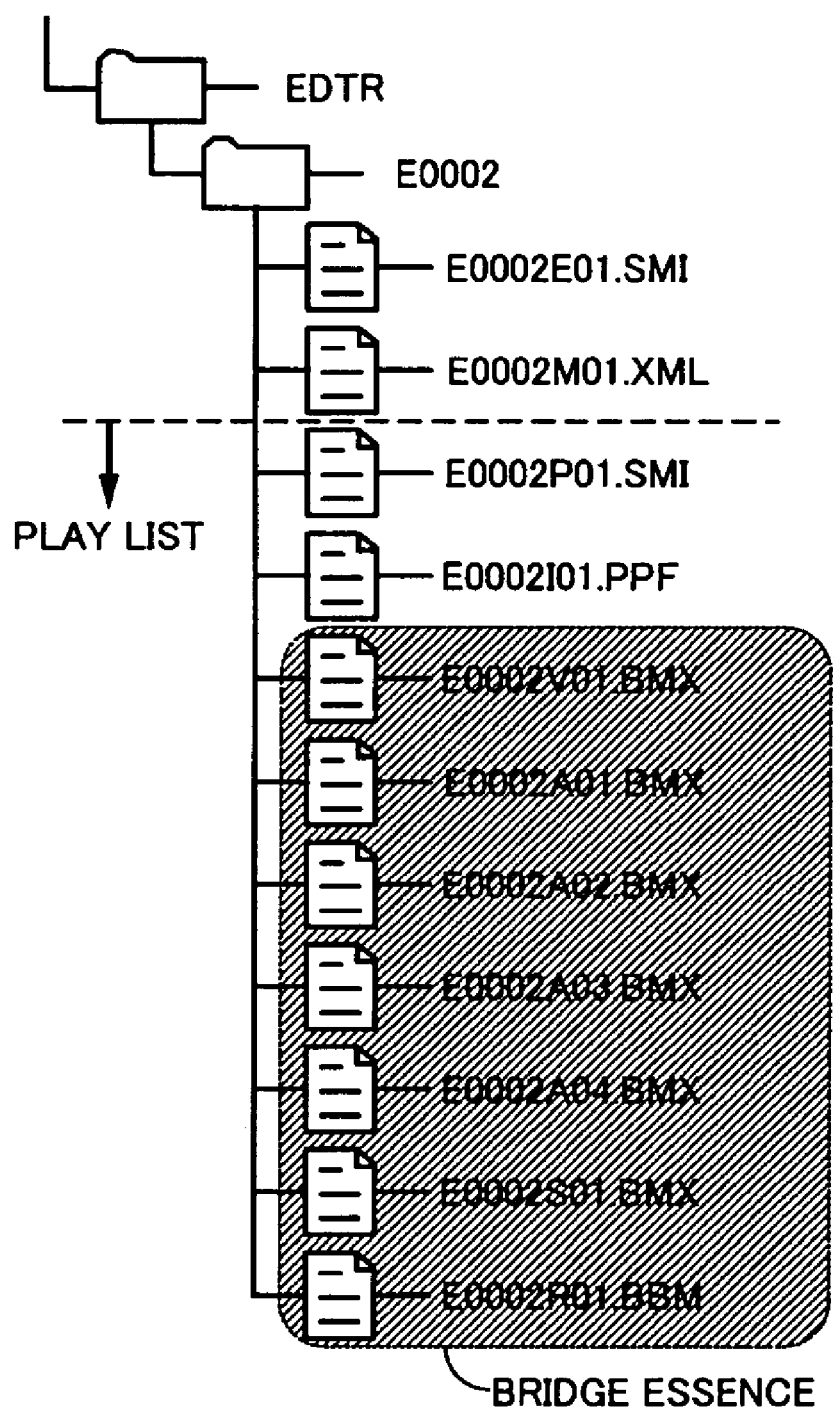
FIG. 7 is a schematic diagram describing a management structure of data.

FIG. 7 shows an example of the structure of the directory "E0002" corresponding to an edit result "E0002." The directory "E0002" is placed immediately below the directory EDTR. Hereinafter, a directory corresponding to one edit result and placed immediately below the directory EDTR is referred to as edit directory. Data generated as an edit result in the foregoing manner are identified by a file name and placed in the edit directory "E0002." As described above, a file name is composed of 12 digits. The first five digits of eight digits followed by the delimiter "." are used to identify an editing operation. The three digits immediately followed by the delimiter are used to identify a data type. The three digits preceded by the delimiter "." are an extension that identifies a data format.

In reality, in the example shown in FIG. 7, as files that compose the edit result "E0002," an edit list file "E0002E01.SMI," a file "E0002M01.XML" for information of chronological and non-chronological meta data, a play list file "E0002P01.SMI," bridge essence files for main data "E0002V01.BMX" and "E0002A01.BMX" to "E0002A04.BMX," a bridge essence file for sub AV data "E0002S01.BMX," and a bridge essence file for chronological and non-chronological meta data "E0002R01.BMX" are placed in the edit directory "E0002."

In FIG. 7, shaded files placed in the edit directory "E0002," namely the bridge essence files for main data "E000V01.BMX" and "E0002A01.BMX" to "E0002A04.BMX," the bridge essence file for sub AV data "E0002S01.BMX" and the bridge essence file for chronological and non-chronological meta data "E0002R01.BMX" are files contained in the play list.

As described above, an edit list references for example video data placed in a clip directory. Since different types of data signals can be placed in clip directories, an edit list can contain different types of data signals.

Returning to FIG. 5, the file "INDEX.XML" is an index file that serves to manage material information placed in the directory PAV or its sub directories. In this example, the file "INDEX.XML" is described in the extensible markup language (XML) format. The file "INDEX.XML" serves to manage the foregoing clips and edit list. For example, with the file "INDEX.XML," a conversion table of file names and UMIDs, duration information, a reproduction order of materials reproduced from the optical disc 1, and so forth are managed. In addition, with the file "INDEX.XML," video data, audio data, sub AV data, and so forth of each clip are managed. Moreover, with the file "INDEX.XML," clip information managed with files in a clip directory is managed.

The file "DISCINFO.XML" serves to manage information of the disc. Reproduction position information and so forth are also placed in the file "DISCINFO.XML."

Figure 8:
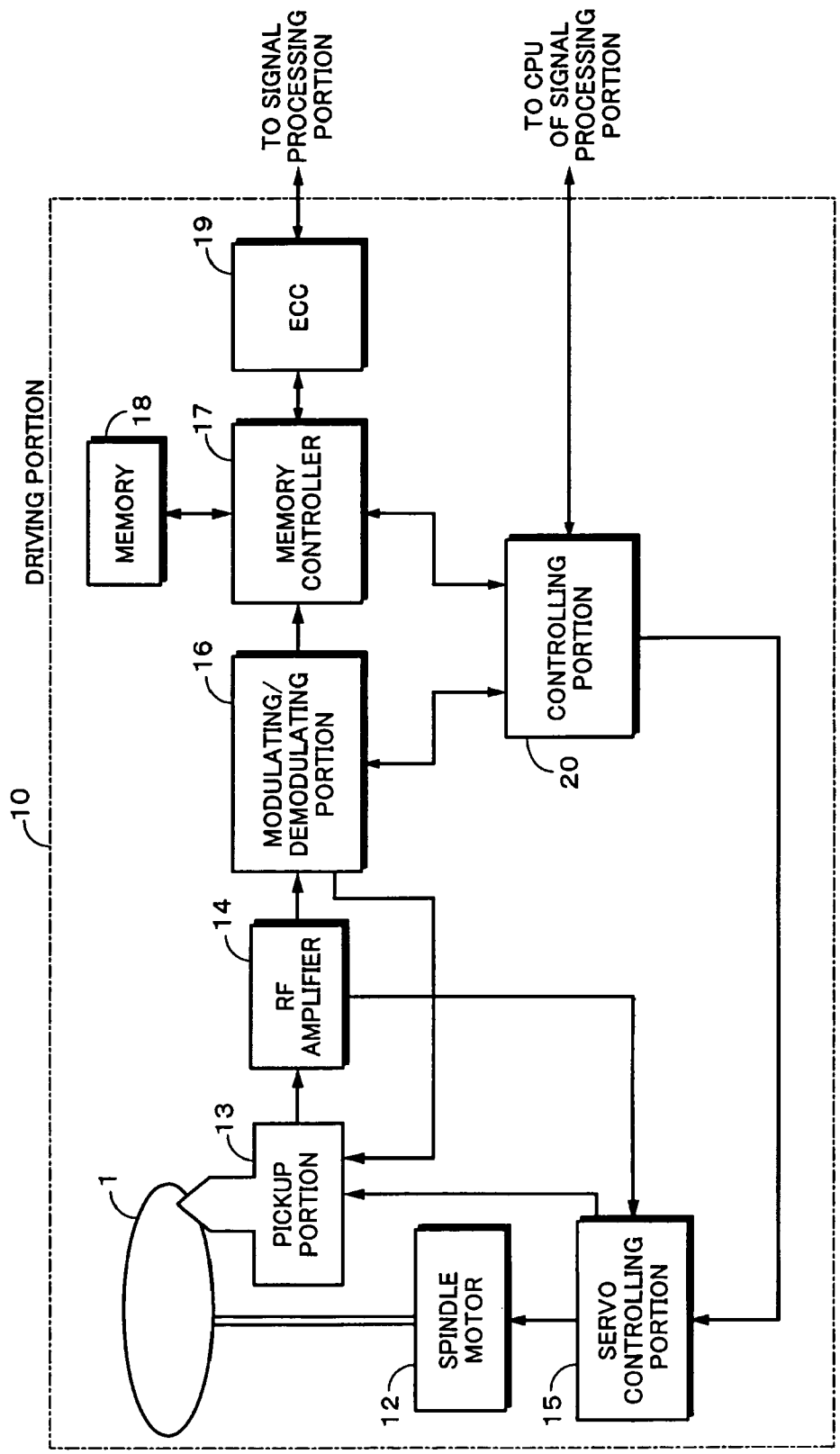
FIG. 8 is a block diagram showing an example of the structure of a driving portion of a recording and reproducing apparatus according to an embodiment of the present invention.

Next, a recording and reproducing apparatus will be described. FIG. 8 shows an example of the structure of a driving portion 10 of the recording and reproducing apparatus.

When data are recorded onto the optical disc 1, record data are supplied from a signal processing portion 41 (that will be described later) (see FIG. 9). The record data are stored in a memory 18 through an error correction coding (ECC) portion 19 and a memory controller 17. The memory controller 17 accesses the memory 18 under the control of a controlling portion 20. The controlling portion 20 is composed of a microcomputer. The controlling portion 20 controls the driving portion 10 in accordance with a control signal received from the signal processing portion 41.

The ECC portion 19 generates an error correction code for each error correction unit of the record data stored in the memory 18. As an error correction code for video data and audio data, a product code can be used. With a product code, data symbols are dually encoded. In other words, a two dimensional array of video data or audio data is encoded with an outer code in the vertical direction and with an inner code in the horizontal direction. As an outer code and an inner code, Reed-Solomon code can be used. A data unit that is completed with a product code is referred to as ECC block. The size of an ECC block is for example 64 kbytes (65536 bytes). The memory controller 17 reads an ECC block from the memory 18 and supplies the ECC block as record data to a modulating/demodulating portion 16. The modulating/demodulating portion 16 modulates the record data, generates a record signal, and supplies the generated record signal to a pickup portion 13.

The pickup portion 13 controls the output of laser light in accordance with the record signal supplied from the modulating/demodulating portion 16 and records the record signal onto the optical disc 1 that is rotated by a spindle motor 12.

The pickup portion 13 converts reflected light of the optical disc 1 into a current signal and supplies the current signal to an radio frequency (RF) amplifier 14. The RF amplifier 14 generates a focus error signal, a tracking error signal, and a reproduction signal in accordance with the current signal supplied from the pickup portion 13. The tracking error signal and the focus error signal are supplied to a servo controlling portion 15. When data are reproduced from the optical disc 1, the RF amplifier 14 supplies the reproduction signal to the modulating/demodulating portion 16.

The radiation position of the laser light is controlled in accordance with a servo signal supplied from the servo controlling portion 15 to the pickup portion 13. In other words, the servo controlling portion 15 controls a focus servo operation and a tracking servo operation. In reality, the servo controlling portion 15 generates a focus servo signal and a tracking servo signal in accordance with the focus error signal and tracking error signal supplied from the RF amplifier 14 and supplies the generated signals to an actuator (not shown) of the pickup portion 13. The servo controlling portion 15 generates a spindle motor drive signal that causes the spindle motor 12 to be driven. The servo controlling portion 15 controls a spindle servo operation for rotating the optical disc 1 at a predetermined velocity.

The servo controlling portion 15 performs a thread controlling operation for moving the pickup portion 13 in the radius direction of the optical disc 1 and changing the radiation position of the laser light. The controlling portion 20 sets the signal read position of the optical disc 1 in accordance with a control signal supplied from the signal processing portion 41. The controlling portion 20 controls the position of the pickup portion 13 so that it can read the signal from the read position.

The spindle motor 12 drives the rotations of the optical disc 1 at constant linear velocity (CLV) or at constant angular velocity (CAV) in accordance with a spindle motor drive signal received from the servo controlling portion 15. The drive mode of the spindle motor 12 can be switched between CLV and CAV in accordance with a control signal received from the signal processing portion 41.

The spindle motor 12 has four switchable drive modes that are CLV×1, CLV×2, CLV×2.4, and CLV×1. The drive mode CLV×1 is used only when the driving portion 10 is started. The drive mode CLV×2 has a data rate two times higher than the drive mode CLV×1. In the drive mode CLV×2, data are written onto the optical disc 1. The drive mode CLV ×2.4 is used when the normal reproducing operation, shuttle reproducing operation, or the like is performed. The drive mode CAV×1 is used when a thumbnail picture is displayed as will be described later.

When data are reproduced from the optical disc 1, the pickup portion 13 focuses laser light on the optical disc 1 and supplies a current signal into which reflected light of the optical disc 1 has been converted to the RF amplifier 14. The modulating/demodulating portion 16 demodulates a reproduction signal supplied from the RF amplifier 14, generates reproduction data, and supplies the generated reproduction data to the memory controller 17. The memory controller 17 writes the supplied reproduction data to the memory 18. The reproduction data are read as ECC blocks from the memory 18 and supplied to the ECC portion 19.

The ECC portion 19 decodes an error correction code of each ECC block of the reproduction data and corrects an error of the reproduction data. When the error exceeds the error correcting capacity of the error correction code, the ECC portion 19 does not correct the error. In this case, the ECC portion 19 places an error flag on the error correction unit of the reproduction data. The reproduction data are supplied from the ECC portion 19 to the signal processing portion 41.

FIG. 9 shows an example of the overall structure of the recording and reproducing apparatus. The driving portion 10 (not shown), an interface portion 40, and an operating portion 42 are connected to the signal processing portion 41. A displaying portion 80 is connected to the signal processing portion 41. The displaying portion 80 is composed of for example a liquid crystal display (LCD). A picture reproduced from the optical disc 1, a picture that is input to the recording and reproducing apparatus, a user interface, and so forth are displayed by the displaying portion 80.

In the signal processing portion 41, the driving portion 10 is connected to a field programmable gate array (FPGA) 64. Record data and reproduction data are exchanged between the driving portion 10 and the signal processing portion 41. In addition, a control signal is exchanged between the signal processing portion 41 and the controlling portion 20 of the driving portion 10 through the FPGA 64.

A RAM 65, an encoder 66, a decoder 67, a DV codec 68, and a sub AV data encoder/decoder 69 are connected to the FPGA 64. The sub AV data encoder/decoder 69 encodes sub video data. A bus 70 is connected to the FPGA 64. An input data audio digital signal processor (DSP) 71, an output data audio DSP 72, and a sub AV data audio DSP 73 are connected to the bus 70. In addition, a bus 60 and an FPGA 74 are connected to the FPGA 64. The FPGA 64 functions as a memory controller for the RAM 65. In addition, the FPGA 64 controls a data flow among individual portions that are connected in the FPGA 64.

A RAM 75 is connected to the FPGA 74. The displaying portion 80, an output terminal 81, and an input terminal 82 are connected to the FPGA 74. A microcomputer 90 of the operating portion 42 is connected to the FPGA 74. The displaying portion 80 has a displaying device and a driving portion. The displaying device is composed of a liquid crystal device (LCD). The driving portion drives the displaying device. Like the foregoing FPGA 64, the FPGA 74 functions as a memory controller for the RAM 75. In addition, the FPGA 74 controls a data flow among individual portions that are connected in the signal processing portion 41.

The bus 60 is for example a peripheral component bus (PCI). A central processing unit (CPU) 61, a read-only memory (ROM) 62, and a random access memory (RAM) 63 are connected to the bus 60. The RAM 63 is used as a work memory for the CPU 61. In reality, the ROM 62 is composed of two rewritable flash memories. One flash memory is used to store a system startup program and the other flash memory is used to pre-store a program and data that are used after the program is started up. The RAM 63 and the other flash memory of the ROM 62 are connected to the CPU 61 through a CPU bus (not shown).

The CPU 61 controls the signal processing portion 41 in accordance with the program stored in the other flash memory of the ROM 62. In addition, the CPU 61 controls the driving portion 10 to access the optical disc 1. In addition, the CPU 61 accesses the memory 18. Moreover, the CPU 61 manages the directory structure of the optical disc I described in FIG. 5 to FIG. 7.

In the interface portion 40, a bus 50 is for example a PCI bus. The bus 50 is connected to the bus 60 through a PCI bridge 57. A communication interface 51, a central processing unit (CPU) 52, a read-only memory (ROM) 53, a random access memory (RAM) 54, and an on-screen display (OSD) portion 55 are connected to the bus 50. The CPU 52, the ROM 53, and the RAM 54 are connected to the bus 50 through a memory controller, a bus controller, and so forth. The RAM 54 is used as a work memory for the CPU 52. The ROM 53 is composed of two rewritable flash memories. One flash memory is used to store a system startup program and the other flash memory is used to store a program and data that are used after the system is started up.

The communication interface 51 controls communication with an external network in accordance with an instruction of the CPU 52. For example, the communication interface 51 can communicate data to the Internet in accordance with the file transfer protocol (FTP). A RAM 56 is connected to the OSD portion 55. The OSD portion 55 generates a picture signal for an user interface in accordance with a display control instruction supplied from the CPU 52.

In the operating portion 42, a switch portion 92 has various types of switches and various types of controllers such as a rotary encoder. The switch portion 92 outputs a signal in accordance with a user's operation against these switches and supplies the control signal to the FPGA 74. The control signal is supplied to the CPU 61 and the CPU 52 in accordance with the type of the control signal. A displaying portion 91 is composed of a plurality of light emitting diodes (LEDs) corresponding to the individual switches of the switch portion 92. The microcomputer 90 controls the LEDs in accordance with the control signal supplied from the switch portion 92. An audio meter 93 is composed of for example a plurality of LEDs. The audio meter 93 displays the level of audio data that are input to the signal processing portion 41 or the level of audio data that are output from the signal processing portion 41 in real time.

A frame synchronous signal corresponding to a frame period of video data is supplied from the outside through an interface (not shown). Alternatively, the frame synchronous signal may be generated in the recording and reproducing apparatus. When necessary, each portion of the recording and reproducing apparatus performs a signal process in synchronization with a frame synchronous signal. The CPU 61 generates a process instruction for main AV data and sub AV data in synchronization with the frame synchronous signal.

In such a structure, when data are recorded onto the optical disc 1, video data and audio data supplied from the outside are input to the input terminal 82. For example, video data and audio data are output from a video camera (not shown) and supplied to the input terminal 82. The video data and audio data are temporarily stored in the RAM 75 and then supplied to the FPGA 64.

The video data and audio data stored in the RAM 65 are supplied to a sub AV data encoder/decoder 69 and a sub AV data audio DSP 73 by the FPGA 64. The sub AV data encoder/decoder 69 and sub AV data audio DSP 73 generate sub AV data.

The sub AV data encoder/decoder 69 compression-encodes the supplied video data in accordance with the MPEG4 system and outputs the encoded data as sub video data. The sub video data that have been compression-encoded by the sub AV data encoder/decoder 69 are written to the RAM 65. The sub AV data encoder/decoder 69 composes one GOP with a total of 10 frames of an I picture of one frame and nine P pictures of nine frames.

The resolution of sub video data of the NTSC system is 352 pixels×240 lines. The resolution of sub video data of the PAL system is 352 pixels×288 lines. When the resolution of the main video data is higher than the resolution of sub video data, the sub AV data encoder/decoder 69 performs a predetermined thin-out process and interpolating process. The color space of sub video data is YCbCr space in which colors are represented by luminance and color difference.

When necessary, the sub AV data audio DSP 73 performs a predetermined signal process such as a level adjusting process for audio data. Thereafter, the audio data are compression-encoded and sub audio data are obtained. As will be described later, for example a thin-out process and an A-Law encoding process are performed for audio data. As a result, the sampling frequency of the audio data is changed from 48 kHz to 8 kHz. In addition, the number of quantizer bits is changed from 16 bits to 8 bits. The sub audio data that have been compression-encoded are written to the RAM 65. Audio data quantized with 24 bits are compression-encoded in such a manner that the low order eight bits of each sample are deleted so that one sample is composed of 16 bits.

While the sub AV data encoder/decoder 69 and the sub AV data audio DSP 73 are encoding sub video data and sub audio data, main AV data are encoded. As described above, the recording and reproducing apparatus according to the embodiment has two process modes for main video data that are a mode for a data rate of 50 Mbps and a mode for a data rate of 25 Mbps.

In the mode for a data rate of 50 Mbps, video data that are read form the RAM 65 are supplied to the encoder 66. The encoder 66 compression-encodes the video data in accordance with the MPEG2 system. At that point, the encoder/decoder 69 encodes video data as all I pictures rather than performing an inter-frame compression in consideration of an editing operation for each frame. In addition, the encoder/decoder 69 properly selects quantizer coefficients in each frame or in each macro block of which each frame is divided so that the data rate of encoded data becomes 50 Mbps. Video data encoded by the encoder 66 is temporarily stored in the RAM 65.

In the mode for a data rate of 25 Mbps, video data that are read from the RAM 65 are supplied to the DV codec portion 68. The DV codec portion 68 performs a compression-encoding process for supplied video data in accordance with for example the DV format. The video data encoded in the DV codec portion 68 are temporarily stored in the RAM 65.

Main audio data of main AV data are read from the RAM 65 by the FPGA 64 and supplied to the audio DSP 71. Main audio data encoded by the audio DSP 71 are stored in the RAM 65.

Main audio data and main video data stored in the RAM 65 for a predetermined reproduction duration corresponding to a growth ring are mapped in a recording format and supplied to the driving portion 10 in accordance with an instruction received from the CPU 61. Likewise, sub audio data and sub video data stored in the RAM 65 for a predetermined reproduction duration corresponding to a growth ring are mapped in a format and supplied to the driving portion 10.

Meta data are generated by for example the ROM 62 in a predetermined manner and stored in the RAM 54. Meta data stored in the RAM 65 for a predetermined reproduction duration corresponding to a growth ring are supplied to the driving portion 10 like the main AV data and sub AV data.

The CPU 61 issues an instruction that causes the driving portion 10 to write main AV data, sub AV data, and meta data as growth rings onto the optical disc 1. This instruction is supplied to the controlling portion 20. The controlling portion 20 causes the ECC portion 19 of the driving portion 10 to add an error correction code to main AV data, sub AV data, and meta data in accordance with the instruction received from the CPU 61. The modulating/demodulating portion 16 modulate the main AV data and sub AV data and outputs a record signal. The controlling portion 20 controls write addresses for the record signal and causes the resultant signal to be written onto the optical disc 1.

When data are reproduced from the optical disc 1, the controlling portion 20 of the driving portion 10 controls read addresses for the data in accordance with an instruction received from the CPU 61. The driving portion 10 reads data as growth rings from the optical disc 1. The ECC portion 19 decodes an error correction code for data that have been read from the optical disc 1 and corrects an error of the data. The error-corrected data are output as main AV data, sub AV data, and meta data from the driving portion 10. The main AV data, sub AV data, and meta data are supplied to the FPGA 64 and stored in the RAM 65.

When main video data of main AV data stored in the RAM 65 are data at a data rate of 50 Mbps, the main video data are supplied to the decoder 67. On the other hand, when main video data are data at a data rate of 25 Mbps, the main video data are supplied to the DV codec portion 68. Main video data decoded in the decoder 67 or the DV codec portion 68 are stored in the RAM 65.

The FPGA 64 reads main audio data of main AV data from the RAM 65 and supplies the main audio data to the audio DSP 72. The audio DSP 72 decodes the main audio data and stores the decoded main audio data in the RAM 65.

While main AV data are being decoded, sub AV data are decoded. The FPGA 64 reads sub video data from the RAM 65 that stores sub AV data and supplies the sub video data to the sub AV data encoder/decoder 69. The sub AV data encoder/decoder 69 decodes the sub video data and stores the decoded sub video data to the RAM 65. Likewise, the FPGA 64 reads sub audio data from the RAM 65 and supplies the sub audio data to the sub AV data audio DSP 73. The sub AV data audio DSP 73 decodes the sub audio data so that the number of quantizer bits is returned from eight bits to 16 bits (or 24 bits), samples are interpolated, and the sampling frequency is changed to 48 kHz. The decoded sub audio data are stored in the RAM 65.

The CPU 61 controls timing of main video data, main audio data, sub video data, and sub audio data that have been decoded and stored in the RAM 65 in accordance with a frame synchronous signal (not shown). These data are synchronously read from the RAM 65. The FPGA 64 controls an address pointer of the RAM 65 in accordance with an instruction received from the CPU 61 and reads main audio data and sub audio data from the RAM 65 so that these data synchronize with video data and the main audio data synchronizes with the sub audio data. The main video data, sub video data, main audio data, and sub audio data that are read from the RAM 65 are supplied to the FPGA 74.

The FPGA 74 supplies main video data to the output terminal 81. In addition, the FPGA 74 supplies sub video data to the displaying portion 80. In addition, the FPGA 74 selects main audio data or sub audio data and supplies the selected audio data to the output terminal 81. The main audio data and sub audio data can be selected and output at predetermined timing in accordance with an instruction received from the CPU 61. When audio data are switched between main audio data and sub audio data is selected, it is preferred to perform a cross fading process for the main audio data and sub audio data so as to reduce switching noise.

On the other hand, as described above, the interface portion 40 has the communication interface 51. The communication interface 51 can receive video data and audio data that have been transferred through for example the Internet in accordance with the FTP and transmit the received video data and audio data to the driving portion 10. In other words, the communication interface 51 receives FTP-transferred data, supplies the data to the FPGA 64 through the bus 50, the PCI bridge 57, and the bus 60, and stores the data to the RAM 65. For example, audio data that have been asynchronously transferred in accordance with the FTP are mapped in the RAM 65 so that the audio data are chronologically successive.

The OSD portion 55 of the interface portion 40 generates picture data for a graphical user interface (GUI) screen with the RAM 56 in accordance with a display control instruction received from the CPU 52. The generated picture data are read from the RAM 56 and transferred to the FPGA 74. The FPGA 74 supplies the picture data to the displaying portion 80. The displaying portion 80 displays for example the GUI screen.

Figures 10A, 10B, 10C, 10D, 10E, 10F:
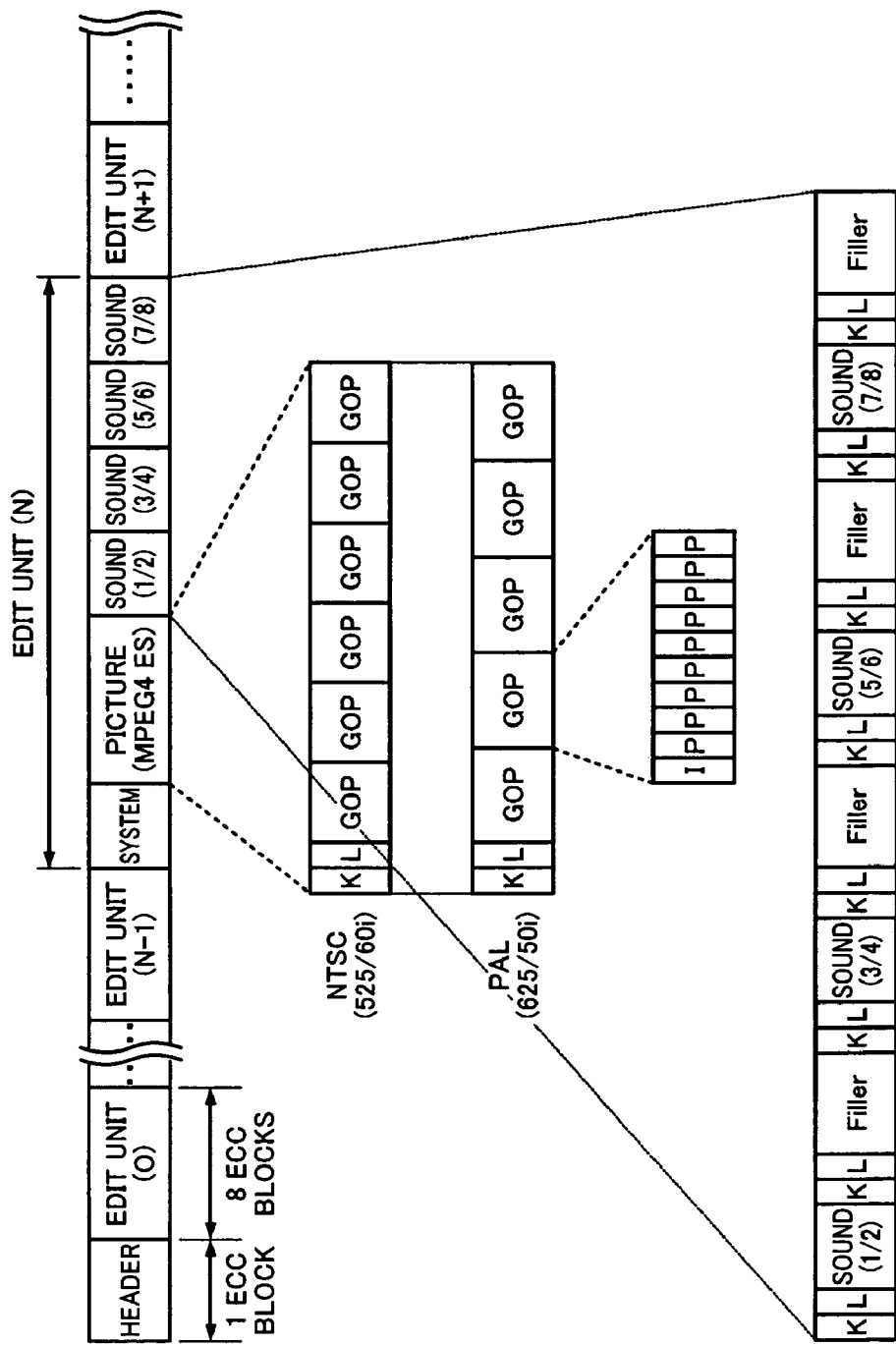
FIG. 10A, FIG. 10B, FIG. 10C, FIG. 10D, FIG. 10E, and FIG. 10F are schematic diagrams showing an example of the format of sub AV data.

FIG. 10A, FIG. 10B, FIG. 10C, FIG. 10D, FIG. 10E, and FIG. 10F show an example of the format of sub AV data. As shown in FIG. 10A, sub AV data are composed of a header portion and a plurality of edit units. A system portion placed at the beginning of each edit unit is a header of the edit unit. In the edit unit, the system portion is followed by sub video data (picture). The sub video data is followed by sub audio data (sound). The sub video data are an elementary stream (ES) in accordance with the MPEG4 system. The sub audio data are composed of data of eight channels, data of two channels being paired. An edit unit is sub video data and sub audio data for a reproduction duration (for example, 2 seconds) corresponding to one growth ring.

An address is assigned to each ECC block of data recorded onto the optical disc 1. Hereinafter, this address is referred to as ECC block address. The ECC portion 19 of the driving portion 10 performs a decoding process for each ECC block in accordance with the ECC block address. Eight ECC blocks are assigned to one edit unit. One ECC block is assigned to the header portion.

FIG. 10B shows an example of the structure of a sub video data storing portion in the case that the video system corresponds to the NTSC system. The video data storing portion starts with a portion "K" that represents the attribute of the next item. For example, the portion "K" represents that the next item is an elementary stream in accordance with the MPEG4 system. The portion "K" is followed by a portion "L." The portion "L" represents the data length of the next item. With the portions "K" and "L," sub video data or sub audio data of two channels are packed.

As shown in FIG. 10D, according to the embodiment of the present invention, one GOP of sub video data is composed of a total of 10 frames of one I picture and nine P pictures. When the video system corresponds to the NTSC system, since the frame rate is 30 frames/second, if one growth ring corresponds to a reproduction duration of two seconds, as shown in FIG. 10B, one edit unit contains six GOPs. When the video system corresponds to the PAL system, since the frame rate is 25 frames/second, as shown in FIG. 10C, one edit unit contains five GOPs.

As shown in FIG. 10E, with respect to sub audio data, the first and second channels, the third and fourth channels, the fifth and sixth channels, and the seventh and eighth channels are paired. A pair of two channels is packed with the portions "K" and "L." A filler portion adjusts the data length of sub audio data with dummy data so that the data length of one edit unit becomes eight ECC blocks. The filler portion is packed with the portions "K" and "L."

One pair of channels is arranged as shown in FIG. 10F. In other words, samples of two channels are alternately arranged. When the video system corresponds to the NTSC system, 16016 samples of sub audio data are packed in a pair of two channels. When the video system corresponds to the PAL system, 16000 samples of sub audio data are packed in a pair of two channels.

Clips recorded on the optical disc 1 can be displayed in a table format of thumbnail pictures by the displaying portion 80. Thumbnail pictures are primarily used as an index of the clips. Since thumbnail pictures do not need high quality, they can be generated with sub AV data. Since the sub AV data have lower resolution and lower data rate than main AV data, the load of the system can be reduced.

For example, an index file "INDEX.XML" is read when the operating portion 42 is operated. As a result, information of all clips recorded on the optical disc 1 is obtained. Thereafter, with reference to each clip directory, thumbnail pictures are automatically generated in accordance with sub AV data. Thumbnail pictures are generated in such a manner that frames at predetermined positions of sub AV data are read and a picture size converting process and a color space converting process are performed for the frames.

FIG. 11A shows an example of a thumbnail display screen 120. The thumbnail display screen 120 is displayed by the displaying portion 80. Alternatively, a display signal of the thumbnail display screen 120 may be output to the output terminal 81 so that the thumbnail display screen 120 is displayed by an external monitor. A predetermined number of thumbnail pictures 121(*a*) . . . 121(*n*), generally referred to as 121, are displayed in a table format on the thumbnail display screen 120.

When a thumbnail display button disposed on the operating portion 42 is operated, the thumbnail display screen 120 is designated. When the thumbnail display screen 120 is designated, the driving portion 10 switches the drive mode of the spindle motor 12 from the CLV drive mode to the CAV drive mode. Thus, the driving portion 10 accesses the optical disc 1 in the CAV drive mode and reads sub AV data in a predetermined manner. With the sub AV data that have been read, thumbnail pictures 121, displayed on one page of the thumbnail display screen 120 are generated. A table of the thumbnail pictures 121 is displayed on the thumbnail display screen 120. In the example shown in FIG. 11A, 12 thumbnail pictures 121 are displayed on one page of the thumbnail display screen 120. The thumbnail pictures 121 are displayed in the order of which clips are recorded.

A table of thumbnail pictures 121 corresponding to clips can be displayed on the thumbnail display screen 120 (this mode is referred to as clip mode). In addition, a table of thumbnail pictures 121 corresponding to edit points can be displayed on the thumbnail display screen 120 (this mode is referred to as edit mode). One of the clip mode and the edit mode can be selected. In the example shown in FIG. 11A, the thumbnail display screen 120 is displayed in the clip mode. The clip mode is represented with an indicator 122 ("CLIP") at an upper right portion of the thumbnail display screen 120.

When cursor keys disposed on the operating portion 42 are operated in a predetermined manner, one thumbnail picture 121 can be selected from the table of the thumbnail pictures 121 displayed on the thumbnail display screen 120. A thumbnail picture 123 that has been currently selected is represented with a frame that is different from frames of thumbnail pictures 121 that have not been selected. An indicator 124 is displayed at an upper left portion of the thumbnail display screen 120. The indicator 124 represents the total number of clips recorded on the optical disc 1 and the clip number of the currently selected thumbnail picture 123. The example shown in FIG. 11A represents that 143 clips have been recorded on the optical disc 1 and that the sixth clip thereof has been selected.

In addition, information about the clip corresponding to the currently selected thumbnail picture 123 is displayed at a lower portion of the thumbnail display screen 120. The information is represented as indicators 125 and 126. The indicator 125 represents the photographed time of the clip corresponding to the currently selected thumbnail picture 123. The indicator 126 represents the duration of the clip of the currently selected thumbnail picture 123.

When for example an OK button of the operating portion 42 is pressed while the clip corresponding to the currently selected thumbnail picture 123 is selected, the clip reproducing mode is designated. When the clip reproducing mode is designated, the driving portion 10 switches the drive mode of the spindle motor 12 from the CAV drive mode to the CLV drive mode. The displaying portion 80 displays a clip display screen 127. Then, the clip reproducing operation is started. When the thumbnail display mode is designated while the clip display screen 127 is displayed, the displaying portion 80 displays the thumbnail display screen 120.

When a predetermined operation is performed with the operating portion 42, the current page of the thumbnail display screen 120 can be changed to another page. When the next page is designated while the thumbnail display screen 120 is displayed, the optical disc 1 is accessed in the CAV drive mode. The next page of thumbnail pictures 121 are read from clips recorded on the optical disc 1 and displayed on the thumbnail display screen 120.

Like the clip mode, in the edit mode, thumbnail pictures 121 are displayed. The thumbnail pictures 121 corresponding to edit points are displayed on the thumbnail display screen 120 in the order of which edit results are reproduced. At that point, the indicator 122 represents that the edit mode has been selected (for example "EDIT"). The indicator 124 represents that the total number of edit points and the edit point number of the currently selected thumbnail picture 123. The indicator 125 represents for example the edit date and time of the currently selected thumbnail picture 123. The indicator 126 represents the duration from the IN point to the OUT point of the edit points.

Figure 12:
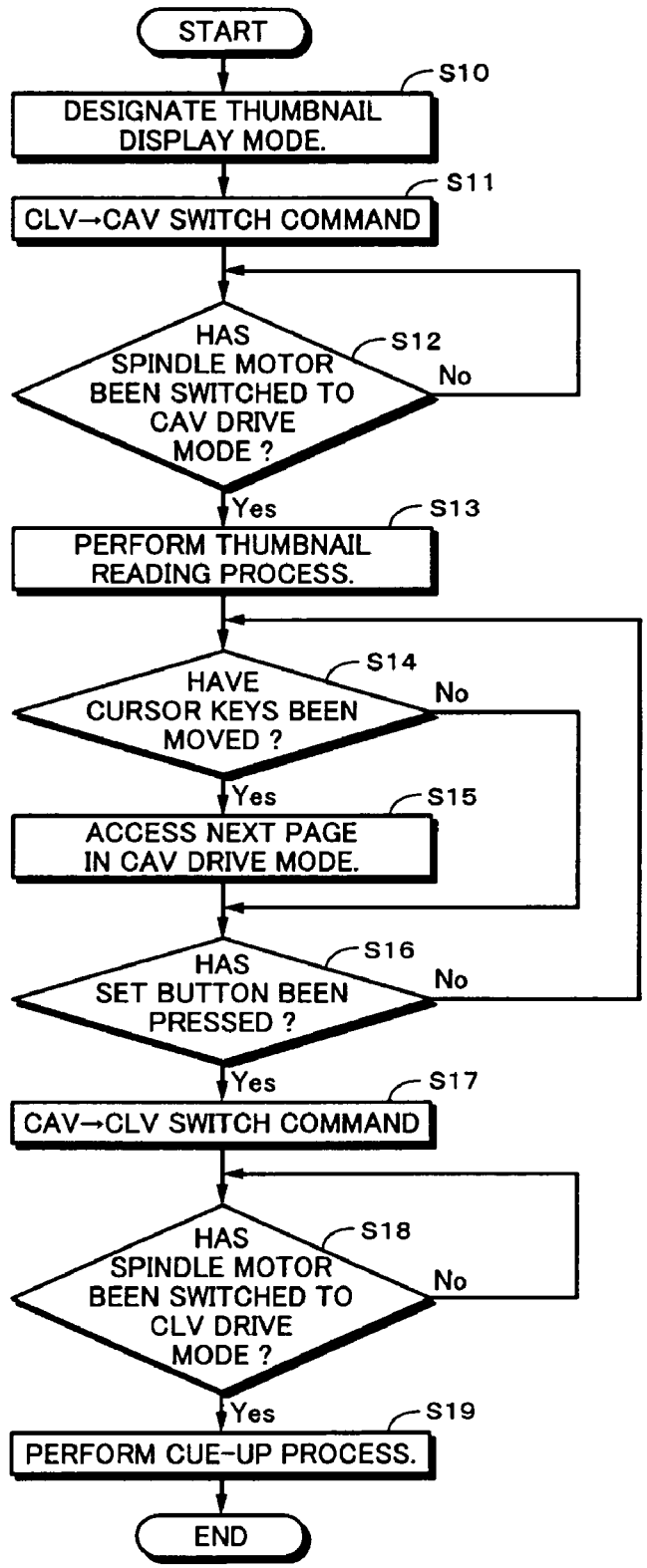
FIG. 12 is an overall flow chart showing an example of a thumbnail displaying process.

Next, the displaying process for the thumbnail display screen 120 will be described in detail. FIG. 12 is an overall flow chart of the thumbnail displaying process. The thumbnail displaying process is performed under the control of the CPU 52. CPU 61 controls each portion of the signal processing portion 41 in accordance with an instruction received from the CPU 52. At step S10, the user designates the thumbnail display mode with the operating portion 42. The operating portion 42 outputs a control signal in accordance with the user's predetermined operation. The control signal is supplied to the CPU 61.

At step S11, the CPU 61 issues a switch command that causes the driving portion 10 (controlling portion 20) to switch the drive mode of the spindle motor 12 from the CLV drive mode to the CAV drive mode in accordance with the control signal received from the operating portion 42. At step S12, it is determined whether the drive mode of the spindle motor 12 has been switched from the CLV drive mode to the CAV drive mode in accordance with the switch command. When the determined result at step S12 is Yes, the flow advances to step S13. At step S13, the optical disc 1 is rotated in the CAV drive mode and sub AV data are read therefrom.

Then, frames corresponding to thumbnail pictures 121 are extracted from the sub AV data that have been read. Thereafter, the thumbnail display screen 120 is displayed.

When a clip is reproduced, the optical disc 1 is rotated at CLV. When a thumbnail is displayed, the optical disc 1 is rotated at CAV. Since data of the thumbnail pictures 121 are randomly read from the optical disc 1, when the optical disc 1 is rotated at CAV of which the rotation speed of the optical disc 1 does not vary in accordance with the access position, the data can be read at higher speed than the case that the optical disc 1 is rotated at CLV.

Of course, when the optical disc 1 is rotated at CAV, since the linear velocity at which the optical disc 1 is accessed on the inner periphery side is largely different from the linear velocity at which the optical disc 1 is accessed on the outer periphery side, when a clip is reproduced, the optical disc 1 should be rotated at CLV.

At step S14, it is determined whether the user has selected another thumbnail picture 123 with the cursor keys and the current page of the thumbnail display screen 120 has been changed to the previous page or the next page. When the determined result at step S14 is Yes, the flow advances to step S15. At step S15, while the spindle motor 12 is still driven at CAV, sub AV data for the changed page of thumbnail pictures 121 are read from the optical disc 1.

At step S16, it is determined whether or not the SET button has pressed and a clip or an edit point corresponding to the selected thumbnail picture 123 has been designated. When the determined result at step S16 is Yes, the flow advances to step S17. At step S17, the CPU 61 issues a switch command that causes the driving portion 10 to switch the drive mode of the spindle motor 12 from the CAV drive mode to the CAL drive mode under the control of the CPU 52. At step S18, it is determined whether or not the drive mode of the spindle motor 12 has been switched from the CAV drive mode to the CLV drive mode in accordance with the switch command. When the determined result at step S18 is Yes, the flow advances to step S19.

At step S19, the driving portion 10 accesses the optical disc 1 in the CLV drive mode for the clip or edit point corresponding to the selected thumbnail picture 123 that has been set at step S16 and performs a cue-up process for the clip or edit point.

Figure 13:
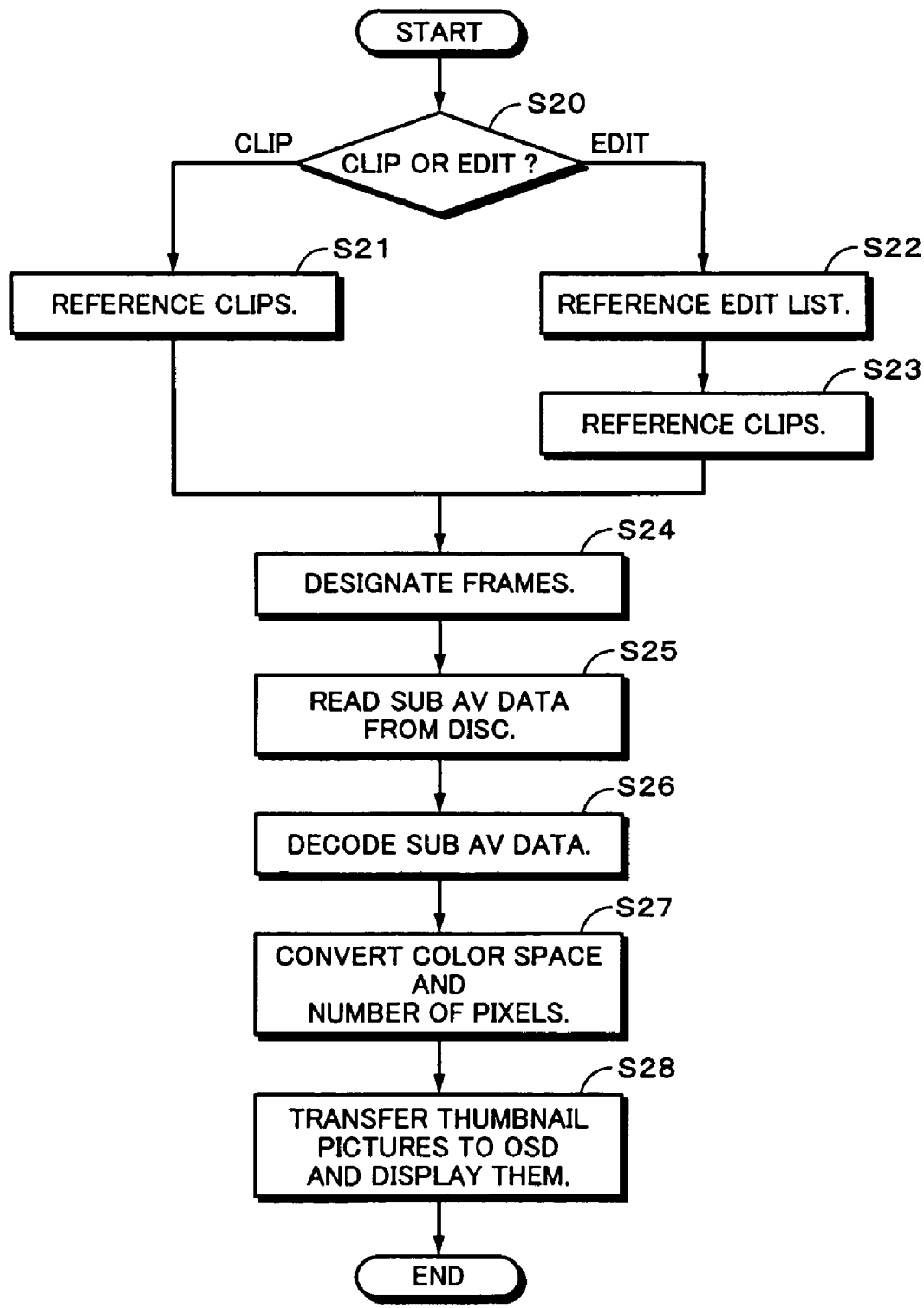
FIG. 13 is a flow chart showing an example of the thumbnail displaying process in detail.

FIG. 13 is a flow chart showing an example of the thumbnail displaying process in detail. FIG. 13 shows the process of step S13 in detail. The process for reading sub AV data from the optical disc 1 slightly varies depending on whether the thumbnail display mode is the clip mode or the edit mode. At step S20, it is determined whether the thumbnail display mode is the clip mode or the edit mode. When the determined result at step S20 is the clip mode, the flow advances to step S21. At step S21, clips recorded on the optical disc 1 are referenced. When the determined result at step S20 is the edit mode, the flow advances to step S22. At step S22, an edit list is referenced. At step S23, clips corresponding to edit points are referenced.

When the optical disc 1 is loaded into the driving portion 10, the driving portion 10 reads four files (INDEX.XML, INDEX.RSV, DISCINFO.XML, and DISCINFO.RSV) immediately below the directory PAV and obtains information about the optical disc 1 and information of files recorded thereon. The processes of steps S21, S22, and S23 are performed in accordance with the obtained information.

When clips are referenced at step S21 or step S23, the flow advances to step S24. At step S24, frames corresponding to thumbnail pictures 121(*a*) ... (*n*) are designated. When the thumbnail display mode is the clip mode, the start frame of each referenced clip is assigned as a frame of a thumbnail picture 121. Alternatively, another frame of each clip may be assigned as a frame of a thumbnail picture 121. When the thumbnail display mode is the edit mode, a frame corresponding to an edit point of a referenced clip is assigned as a frame of a thumbnail picture 121.

When frames have been designated, the flow advances to step S25. At step S25, a predetermined area including the designated frames is read from sub AV data recorded on the optical disc 1. The data that have been read are supplied from the driving portion 10 to the signal processing portion 41. Thereafter, the data are temporarily stored in the RAM 65. Then, the data are supplied to the sub AV data encoder/decoder 69 through the FPGA 64. At step S26, the sub AV data encoder/decoder 69 decodes the supplied data and extracts the designated frame from the decoded data. The extracted frames are output from the sub AV data encoder/decoder 69 and temporarily stored in the RAM 54 through the FPGA 64, the bus 60, the PCI bridge 57, and the bus 50.

At step S27, the CPU 52 performs a color space converting process and a number-of-pixel converting process for the frames stored in the RAM 54 and generates thumbnail pictures 121(*a*) ... (*n*). As described above, the color space of the sub video data is YCbCr space. The color space converting process serves to convert the YCbCr space into a color space composed of three primary colors of RGB suitable for the displaying portion 80. In addition, as described above, the picture size of sub video data of the NTSC system is 352 pixels×240 lines, whereas the picture size of sub video data of the PAL system is 352 pixels×288 lines. In the number-of-pixel converting process, the number of pixels of the picture size of each thumbnail picture 121 is thinned out in a predetermined manner. In addition to the number-of-pixel converting process, an interpolating process may be used.

At step S28, the thumbnail pictures 121 generated at step S27 are supplied to the OSD portion 55. The OSD portion 55 writes the supplied thumbnail pictures 121 to the RAM 56. Various types of attribute information for the indicators 122, 124, 125, and 126 displayed on the thumbnail display screen 120 are obtained by the CPU 61 in accordance with an instruction received from the CPU 52. These information is supplied from the CPU 61 to the OSD portion 55. After display data of the thumbnail display screen 120 have been generated, the display data are read from the RAM 56 and supplied to the FPGA 74. The FPGA 74 supplies the data received from the RAM 56 to the displaying portion 80. The thumbnail display screen 120 is displayed by the displaying portion 80.

Next, the process of step S25 for reading sub AV data from the optical disc 1 will be described in detail. Information used to display each thumbnail picture 121 is a clip ID that identifies a clip and frame position information that represents the frame position in the clip. When the thumbnail display mode is the clip mode, the start frame of each clip is extracted. On the other hand, when the thumbnail display mode is the edit mode, frames corresponding to edit points of clips selected in accordance with the edit list are extracted. In other words, the seek positions and read sizes for the optical disc 1 should be obtained in accordance with the clip IDs and frame positions.

In the following expressions, (x/y) represents the quotient of (x÷y), whereas (x % y) represents the remainder of (x÷y). In the following expressions, each value is based on 0.

As described above, one GOP of video data of sub AV data of sub AV data is composed of 10 frames. Thus, the frame position f from the beginning of the file is represented by (f % 10)-th frame of the (f/10)-th GOP from the beginning of the file. In addition, it is assumed that the (f/10)-th GOP is the g-th GOP from the beginning of the file. As described with reference to FIG. 10, the number of GOPs of one edit unit is fixed to N that depends on the video system (N=6 in NTSC system; N=5 in PAL system). Thus, when the video system corresponds to the NTSC system, the g-th GOP is contained in the (g/N)-th edit unit. The g-th GOP is the (g % N)-th GOP of the edit unit.

Thus, the address of the f-th frame from the beginning of the file can be identified as for example "C-th frame of B-th GOP of A-th edit unit." In addition, since the edit unit and GOP size are fixed, the position of the f-th frame can be represented as the byte position from the beginning of the file.

One GOP of sub video data may be composed of one I picture and nine P pictures. When a frame of a P picture is displayed as a thumbnail picture 121, the frame should be decoded with another type of a picture (namely, an I picture). When a thumbnail picture 121 is displayed in the edit mode, a P picture may be used. On the other hand, in the clip mode, only an I picture is used.

As described with reference to FIG. 10, one edit unit of sub AV data is assigned eight ECC blocks. Thus, the boundary of a GOP does not match the boundary of an ECC block. In other words, if the optical disc 1 is accessed for each GOP and one GOP that contains a desired frame is read, an error code can not be fully decoded. Thus, GOPs are read from the optical disc 1 in accordance with ECC blocks.

With reference to FIG. 14A, 14B, and 14C, the process for reading GOPs from the optical disc 1 in accordance with ECC blocks. FIG. 14A shows a part of sub video data of an edit unit in accordance with a sub AV data format. It is assumed that a frame of a thumbnail picture 121 is contained in a GOP 130 denoted by hatched lines in FIG. 14A. On the other hand, one edit unit is assigned eight ECC blocks. As shown in FIG. 14B, the boundary of a GOP does not match the boundary of an ECC block.

To solve such a problem, two ECC blocks 131 and 132 that contain the GOP 130 denoted by hatched lines in FIG. 14A are read from the optical disc 1. The ECC blocks 131 and 132 are decoded with an error correction code. The decoded data of the ECC blocks 131 and 132 are supplied from the driving portion 10 to the signal processing portion 41 and then written to the RAM 65.

The CPU 61 identifies a portion corresponding to the GOP 130 of the decoded data of the ECC blocks 131 and 132 and reads data of the GOP 130. The data of the GOP 130 are supplied to the sub AV data encoder/decoder 69. The CPU 61 extracts a frame of a thumbnail picture 121 from the decoded frame of the GOP 130 and supplies the extracted frame to the CPU 52.

In the foregoing example, two ECC blocks are read and one GOP is reproduced. However, the present invention is not limited to such an example. When a GOP is fully contained in one ECC block, only the ECC block can be read.

Next, an access controlling process for the optical disc 1 in the case that the thumbnail display mode is the edit mode will be described. It is preferred that thumbnail pictures 121(*a*) . . . (*n*) be placed on the thumbnail display screen 120 in the order of which the edit points are reproduced. On the other hand, the order of which edit points are reproduced may not match the order of which clips are recorded on the optical disc 1. Thus, when an attempted is made to display the thumbnail pictures 121(*a*) . . . (*n*) of edit points in the order of which they are arranged on the thumbnail display screen 120, the optical disc 1 cannot be accessed for the edit points in the shortest distance. As a result, it may take a long time until all thumbnail pictures 121(*a*) . . . (*n*) are displayed on the thumbnail display screen 120.

When the thumbnail pictures 121(*a*) . . . (*n*) of edit points are displayed, the optical disc 1 is accessed for edit points of clips in the order of the recording positions of the edit points on the optical disc 1. Thus, thumbnail pictures can be displayed in the edit mode at high speed.

At that point, the order of which thumbnail pictures 121(*a*) . . . (*n*) of edit points are displayed on the thumbnail displaying screen 120 is different from the order of which the thumbnail pictures 121(*a*) . . . (*n*) are arranged on the thumbnail display screen 120.

Figure 15A:
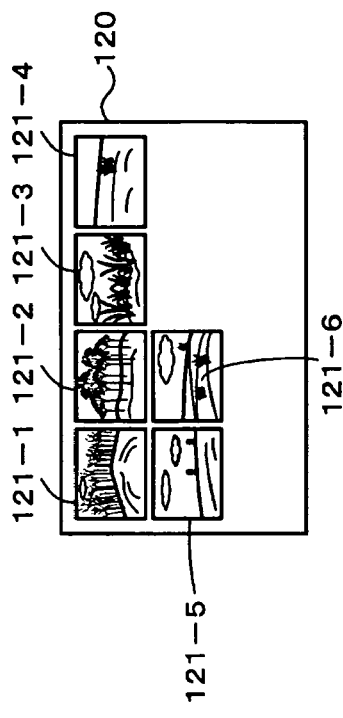
FIG. 15A, FIG. 15B, and FIG. 15C are schematic diagrams describing a process for accessing a disc for thumbnail pictures.
Figure 15B:
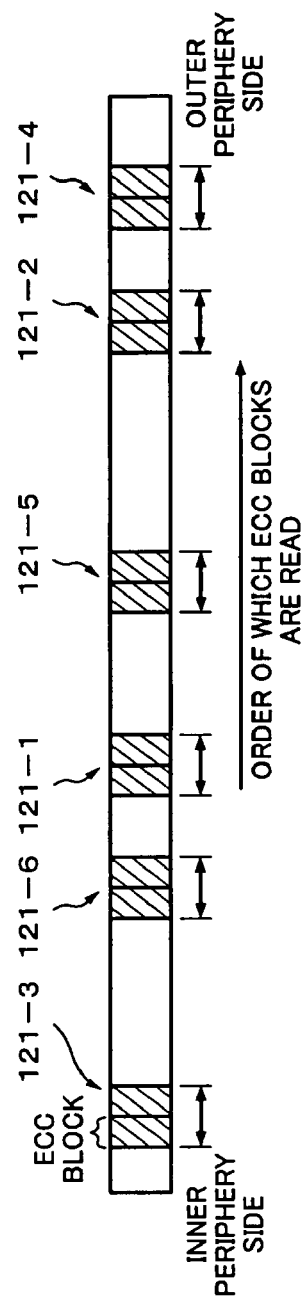
Figure 15C:
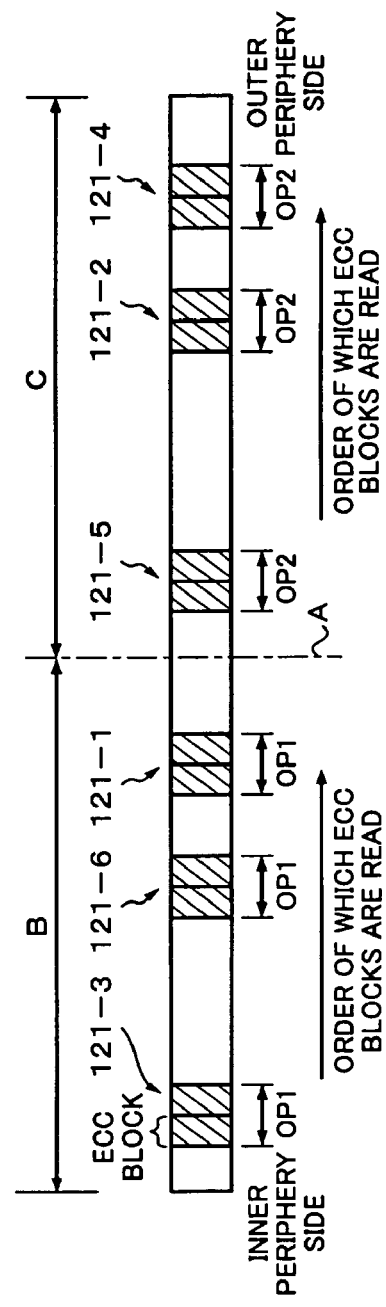

FIG. 15A, 15B, and FIG. 15C show schematic diagrams showing a process for accessing the optical disc 1 for thumbnail pictures that are displayed. As shown in FIG. 15A, it is assumed that six thumbnail pictures 121-1 to 121-6 are displayed on the thumbnail display screen 120 in the edit mode. Suffixes 1 to 6 of reference numeral 121 represent the order of which edit results of the edit points are reproduced. On the thumbnail display screen 120, the thumbnail pictures 121-1 to 121-6 are arranged in the order of the edit results are reproduced.

On the other hand, as shown in FIG. 15B, GOPs containing frames of the thumbnail pictures 121-1 to 121-6 are recorded from the inner periphery side to the outer periphery side on the optical disc 1 regardless of the order of which the edit results are reproduced. In the example shown in FIG. 15B, GOPs are recorded from the inner periphery side to the outer periphery side on the optical disc 1 in the order of the thumbnail pictures 121-3, 121-6, 121-1, 121-5, 121-2, and 121-4.

As described with reference to FIG. 14, when one GOP is reproduced, two ECC blocks are read. FIG. 15B shows pairs of two ECC blocks corresponding to GOPs for the thumbnail pictures 121-1 to 121-6. For example, when the thumbnail picture 121-3 is displayed, two ECC blocks containing a GOP corresponding to the frame of the thumbnail picture 121-3 are read.

When GOPs have been recorded on the optical disc 1 as shown in FIG. 15B, if the optical disc 1 is accessed in the order of which the thumbnail pictures 121-1 to 121-6 are arranged on the thumbnail display screen 120, the seek distance for the optical disc 1 does not become the shortest. In addition, the seek directions are changed. Thus, the optical disc 1 cannot be effectively accessed.

Thus, ECC blocks are read from the lowest ECC block address. In the example shown in FIG. 15B, ECC blocks containing GOPs having the thumbnail pictures 121-1 to 121-6 displayed on the thumbnail display screen 120 are read in the order of the thumbnail pictures 121-3, 121-6, 121-1, 121-5, 121-2, and 121-4 that have been recorded. The thumbnail pictures 121-1 to 121-6 are displayed on the thumbnail display screen 120 shown in FIG. 15A in the order of the thumbnail pictures 121-3, 121-6, 121-1, 121-5, 121-2, and 121-4 that have been read.

In such a manner, since data of the thumbnail pictures 121-1 to 121-6 are read from the optical disc 1 in the order of which they have been recorded, the driving portion 10 can always access the optical disc 1 from the inner periphery side to the outer periphery side. In addition, the seek distance becomes the shortest. Thus, the optical disc 1 can be effectively accessed. As a result, the thumbnail pictures 121(*a*) . . . (*n*) can be quickly displayed on the thumbnail display screen 120.

In the foregoing description, it is assumed that the driving portion 10 has one pickup portion 13. On the other hand, a system of which a driving portion 10 has a plurality of pickup portions 13, for example two pickup portions 13, has been proposed. In this case, the driving portion 10 is composed of the structure shown in FIG. 8 and another set of a pickup portion 13, an RF amplifier 14, a signal processing portion 16, an actuator for the pickup portion 13, and so forth. The two pickup portions 13 can be independently controlled as long as their operations are not adversely affected.

Next, the case that the process for accessing the optical disc 1 for thumbnail pictures in the edit mode is applied to a system of which a driving portion 10 has two pickup portions 13 will be described. In the following description, two pickup portions 13 are referred to as pickup OP1 and pickup OP2. In this case, as shown in FIG. 15C, the optical disc 1 is divided into an inner periphery side area B and an outer periphery side area C at a predetermined radius position A. The inner periphery side area B is accessed by the pickup OP1. The outer periphery side area C is accessed by the pickup OP2. Like the system of which the driving portion has one pickup portion 13, ECC blocks are read from the inner periphery side area B and the outer periphery side area C in the ascending order of the ECC block addresses.

The radius position A at which the optical disc 1 is divided into the inner periphery side area B and the outer periphery side area C can be designated in accordance with the total data size of data that are finally read from the optical disc 1. The total data size represents the total data size of all ECC blocks displayed on one page of the thumbnail display screen 120. In the example shown in FIG. 15A to FIG. 15C, two ECC blocks are read for each of the six thumbnail pictures 121-1 to 121-6. As a result, a total of 12 ECC blocks are read from the optical disc 1. The radius position A is designated so that six ECC blocks are placed in each of the inner periphery side area B and the outer periphery side area C. The pickups OP1 and OP2 successively access six ECC block in the respective areas from the inner periphery side to the outer periphery side.

Besides the method for designating the radius position A in accordance with the data size, the radius position A may be designated in accordance with the seek time and the seek distance. For example, the radius position A is designated so that the difference between the total seek time of the pickup OP1 and the total seek time of the pickup OP2 becomes small. Likewise, the radius position A can be designated so that the distance between the seek distance of the pickup OP1 and the seek distance of the pickup OP2 becomes small. The seek time and seek distance can be calculated in accordance with the ECC block address of an ECC block that is read. Alternatively, the radius position A can be designated in a combination of the foregoing methods. For example, in accordance with the distribution of ECC blocks on the optical disc 1, at least one of data size, seek time, and seek distance can be selected so as to designate the radius position A.

When two pickups are used, if the optical disc 1 is driven at CLV, the two pickups should be positioned on the nearly same circumference. When the two pickups are spaced apart in the radius direction, the linear velocities of the pickups differ from each other. In the CAV drive mode, since the optical disc 1 is always rotated at constant angular velocity, the pickups do not need to be positioned on the nearly same circumference. Thus, when the optical disc 1 is divided into two areas and the pickups are independently controlled in the respective areas, the optical disc 1 should be driven at CAV.

The number of pickups is not limited to two. Instead, more pickups can be used. In this case, the optical disc 1 is divided into areas corresponding to the number of pickups. In each area, data are reproduced in the order of which the data have been recorded. The divided positions of the optical disc 1 may be designated in the same manner as the case that two pickups are used.

In the foregoing example, the present invention is applied to the format of which data are recorded as growth rings on the optical disc 1. However, the present invention is not limited to such an example. Indeed, the present invention can be applied to the normal format of which data are recorded as files. In addition, in the foregoing example, thumbnail pictures are generated with sub video data. However, when thumbnail pictures are generated with main video data, the present invention can be applied. In this case, only main video data may be recorded on the optical disc 1.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A reproducing apparatus, comprising:
   driving means for rotationally driving a disc-shaped recording medium at CLV and CAV; and
   reproducing means for reproducing first video data and second video data from the disc-shaped recording medium rotationally driven by the driving means, the second video data having been compression-encoded at a higher compression rate than the first video data,
   wherein the first video data and the second video data are recorded in the disc-shaped recording medium in a data unit represented by reproduction duration and each recorded data unit matches the boundary of a sector of the disc-shaped recording medium,
   wherein the reproducing means is configured to operate in a first operation mode and a second operation mode,
   wherein the reproducing means is configured to chronologically and successively reproduce the first video data and/or the second video data from the disc-shaped recording medium in the first operation mode and to randomly reproduce the second video data from the disc-shaped recording medium, generate a thumbnail picture with the reproduced second video data, and display the thumbnail picture in the second operation mode,
   wherein during an edit mode of the second video data, a displaying order of a plurality of thumbnail pictures is different from a screen arrangement order of the plurality of thumbnail pictures,
   wherein when the reproducing means operates in the first operation mode, the driving means is configured to rotationally drive the disc-shaped recording medium at CLV, and
   wherein when the reproducing means operates in the second operation mode, the driving means is configured to rotationally drive the disc-shaped recording medium at CAV.

2. The reproducing apparatus as set forth in claim 1,
   wherein the first operation mode and the second operation mode are switchable from one mode to the other mode.

3. The reproducing apparatus as set forth in claim 1,
   wherein a thumbnail picture corresponding to a clip is displayed in the second operation mode.

4. The reproducing apparatus as set forth in claim 3,
   wherein the first operation mode and the second operation mode are switchable from one mode to the other mode, and
   wherein when the thumbnail picture is selected in the second operation mode and the second operation mode is switched to the first operation mode, the clip corresponding to the selected thumbnail picture is reproduced.

5. The reproducing apparatus as set forth in claim 1,
wherein a thumbnail picture corresponding to an edit point is displayed in the second operation mode.

6. The reproducing apparatus as set forth in claim 5,
wherein the first operation mode and the second operation mode are switchable from one mode to the other mode, and
wherein when the thumbnail picture is selected in the second operation mode and the second operation mode is switched to the first operation mode, the first video data are reproduced from the edit point corresponding to the selected thumbnail picture.

7. The reproducing apparatus as set forth in claim 1,
wherein in the second operation mode, the second video data are read so as to generate thumbnail pictures displayed on one page of a screen.

8. A reproducing method, comprising the steps of:
rotationally driving a disc-shaped recording medium at CLV and CAV;
reproducing first video data and second video data from the disc-shaped recording medium rotationally driven at the driving step, the second video data having been compression-encoded at a higher compression rate than the first video data; and
recording the first video data and the second video data in the disc-shaped recording medium in a data unit represented by reproduction duration, each recorded data unit matching the boundary of a sector of the disc-shaped recording medium,
wherein the reproducing step is performed by operating in a first operation mode and a second operation mode,
wherein the reproducing step is performed by chronologically and successively reproducing the first video data and/or the second video data from the disc-shaped recording medium in the first operation mode and by dispersedly reproducing the second video data from the disc-shaped recording medium, generating a thumbnail picture with the reproduced second video data, and displaying the thumbnail picture in the second operation mode,
wherein during an edit mode of the second video data, a displaying order of a plurality of thumbnail pictures is different from a screen arrangement order of the plurality of thumbnail pictures,
wherein when the reproducing step is performed by operating in the first operation mode, the driving step is performed by rotationally driving the disc-shaped recording medium at CLV, and
wherein when the reproducing step is performed by operating in the second operation mode, the driving step is performed by rotationally driving the disc-shaped recording medium at CAV.

9. A driving apparatus comprising:
a driving unit for rotationally driving a disc-shaped recording medium at CLV and CAV, first video data and second video data having been recorded on the disc-shaped recording medium, the second video data having being compression-encoded at a higher compression rate than the first video data,
wherein the first video data and the second video data are recorded in the disc-shaped recording medium in a data unit represented by reproduction duration and each recorded data unit matches the boundary of a sector of the disc-shaped recording medium,
wherein during an edit mode of the second video data, a displaying order of a plurality of thumbnail pictures is different from a screen arrangement order of the plurality of thumbnail pictures, and
wherein the disc-shaped recording medium is rotationally driven at CLV in a first operation mode of which the first video data and the second video data are chronologically and successively reproduced from the disc-shaped recording medium and at CAV in a second operation mode of which the second video data are dispersedly reproduced from the disc-shaped recording medium, a thumbnail picture is generated with the reproduced second video data, and the thumbnail picture is displayed.

10. The driving apparatus as set forth in claim 9,
wherein the CAV at which the disc-shaped recording medium is rotationally driven and the CLV at which the disc-shaped recording medium is rotationally driven are switchable from one mode to the other mode.

11. A driving method for rotationally driving a disc-shaped recording medium at CLV and CAV, first video data and second video data having been recorded on the disc-shaped recording medium, the second video data having being compression-encoded at a higher compression rate than the first video data, the driving method comprising the steps of:
rotationally driving the disc-shaped recording medium at CLV in a first operation mode of which the first video data and/or the second video data are chronologically;
successively reproduced from the disc-shaped recording medium;
rotationally driving the disc-shaped recording medium at CAV in a second operation mode of which the second video data are dispersedly reproduced from the disc-shaped recording medium, a thumbnail picture is generated with the reproduced second video data, and the thumbnail picture is displayed; and
recording the first video data and the second video data in the disc-shaped recording medium in a data unit represented by reproduction duration, each recorded data unit matching the boundary of a sector of the disc-shaped recording medium,
wherein during an edit mode of the second video data, a displaying order of a plurality of thumbnail pictures is different from a screen arrangement order of the plurality of thumbnail pictures.

* * * * *